US005153785A

United States Patent [19]
Muranushi et al.

[11] Patent Number: 5,153,785
[45] Date of Patent: Oct. 6, 1992

[54] APPARATUS FOR MEASURING THE CLEARANCE OF RECORDING TRANSDUCER, AND A RECORDER USING THE APPARATUS, AND A METHOD OF CONTROLLING THE RECORDER

[75] Inventors: Fumitaka Muranushi; Katsuyuki Tanaka; Yoshinori Takeuchi, all of Ibaraki, Japan

[73] Assignee: Hitachi, Ltd., Tokyo, Japan

[21] Appl. No.: 408,199

[22] Filed: Sep. 15, 1989

[30] Foreign Application Priority Data

Sep. 19, 1988 [JP] Japan .............................. 63-232461
Sep. 28, 1988 [JP] Japan .............................. 63-243322

[51] Int. Cl.⁵ .............................................. G11B 21/21
[52] U.S. Cl. ..................................... 360/75; 360/103; 369/43
[58] Field of Search .................... 360/75, 103; 369/43

[56] References Cited

U.S. PATENT DOCUMENTS 4,853,810  8/1989  Pohl et al. ........................... 360/103

FOREIGN PATENT DOCUMENTS 0227845   7/1987  European Pat. Off. ............ 360/103
62-125521  6/1987  Japan ................................... 360/103
62-250570 10/1987  Japan ................................... 360/75

OTHER PUBLICATIONS

U.S. Ser. No. 06/855022 filed Nov. 1987 by Cocke et al.

*Primary Examiner*—Aristotelis Psitos
*Assistant Examiner*—David L. Robertson
*Attorney, Agent, or Firm*—Antonelli, Terry, Stout & Kraus

[57] ABSTRACT

An apparatus for measuring the clearance between a recording transducer and a recording medium, which includes at least a conductive layer or conductive section, comprises a field electron emission electrode section disposed on the recording transducer, a voltage source for applying a voltage, which is greater at least in its peak value than the work functions of the electrode section and the conductive layer or conductive section of the recording medium, between the electrode section and the conductive layer or conductive section of the recording medium, a current measuring device for measuring the current flowing from the voltage source to the electrode section and the conductive layer or conductive section of the recording medium, and a computation processor for calculating the distance between the electrode section and the recording medium from the value of current measured by the current measuring device. A recording apparatus having the recording transducer clearance measuring apparatus is designed to support the recording transducer, which records and reproduces data on the recording medium, with a recording transducer supporting device through an advance/retract mechanism and to drive the mechanism in accordance with the distance calculated by the computation processor so as to adjust appropriately the clearance between the recording transducer and recording medium. A control method for the recording apparatus alters the operational condition of the recording apparatus if the clearance has exceeded a certain preset value.

24 Claims, 27 Drawing Sheets

DISTANCE BETWEEN ELECTRODE
AND RECORDING MEDIUM SURFACE (HEAD CARRIER BOTTOM VIEW)

APPARATUS FOR MEASURING THE CLEARANCE OF RECORDING TRANSDUCER, AND A RECORDER USING THE APPARATUS, AND A METHOD OF CONTROLLING THE RECORDER

BACKGROUND OF THE INVENTION

This invention relates to an apparatus for measuring the clearance between a recording transducer and a recording medium, such as a magnetic recording medium, and a recorder using the apparatus, and a method of controlling the recorder.

Particularly, this invention relates to a head clearance measuring apparatus which is suitable for measuring the clearance of the magnetic head over a mounted magnetic recording medium of various types, and suitable for measuring a very small head clearance in a short time and at a high accuracy.

The invention further relates to a recorder which uses the above-mentioned head clearance measuring apparatus for controlling the clearance between the recording head and recording medium, thereby making a smaller head clearance for the achievement of higher density recording, and is highly adaptable to extensive shapes of a recording medium surface, and the invention also relates to a control method for the recorder.

For high density recording of a magnetic recorder, the clearance (aerodynamic lift) of the recording transducer over the recording medium needs to be small. Conventionally, the head clearance has been measured on the basis of the light interference or the variation of electrostatic capacity, or by using a laser doppler velocity meter. However, it is not possible or is very difficult for these methods to measure a head clearance of 0.1 μm (100 nm) or less.

In recorders which operate with a clearance maintained between the recording transducer and recording medium, a reduced clearance can result in a higher recording density. One method for positioning the recording transducer to have a constant clearance against extensive shapes of the recording medium surface is to cover the medium surface with a conductor and fit an electrode on the recording transducer carrier, so that the head clearance is controlled using a tunnel current flowing between the transducer electrode and recording medium conductor, as disclosed in Japanese Patent Unexamined Publication No. 62-125521, for example.

Another method uses an actuator provided between the head carrier and the head so as to produce a relative movement between these members in conjunction with a contact sensor or electrostatic capacity sensor, thereby controlling the clearance between the recording transducer and recording medium, as disclosed in Japanese Patent Unexamined Publication No. 62-250570, for example.

In the case of the conventional magnetic head clearance measuring apparatus based on the light interference, when the head clearance becomes a quarter wavelength or less of the measuring light, interference fringes disappear, making accurate measurement difficult. The measurement of displacement based on the variation of electrostatic capacity or laser doppler is useful for the measurement of the head clearance over the recording medium, but it cannot reveal the absolute clearance value.

A recent proposal for the head clearance control uses the tunneling phenomenon (Japanese Patent Unexamined Publication No. 62-125521). This method offers the measurement of an extremely small clearance of 1 nm or less between two conductors confronting each other in a vacuum or near-vacuum environment. This method, however, requires both of the recording medium and electrode to have a conductive surface, and therefore it cannot be applied to the head clearance measurement over a magnetic disk whose surface is in most cases coated with a nonconductive lubricant or protection film. Namely, the method is not suited to measure the head clearance over a magnetic disk which is already mounted for operation.

A crucial factor in the measurement of an extremely small head clearance is the shape of the recording medium surface. In this respect, the method based on the tunnel current is restricted in the type of recording medium. The tunnel current, which is inversely proportional to the exponent of the distance between conductors multiplied by a constant, is approximately 1 nA at a 1 nm distance, and the current decreases sharply as the distance increases. The current value is less related to the shape of electrode, since only couples of atoms in a shortest distance contribute to the tunnel current dominantly, leaving other atoms more distant by one atom diameter (0.1–0.3 nm) to produce a significantly diminished tunnel current. On this account, in order to increase the intensity of tunnel current by varying the shape of electrode, the electrode needs to be finished as precise as a fraction of 1-atom dimension, and it is very difficult and costly. Accordingly, the detection, measurement and assessment of a tunnel current flowing between two conductors spaced out by several nanometers or more is only feasible by using an expensive apparatus.

A tunnel current is as small as 1 nA and therefore susceptible to electrical noise. In addition, a current created by a varying capacitance caused by a varying clearance between the tunnel electrode and recording medium can influence significantly the signal current. Moreover, the voltage for maintaining the tunneling phenomenon is as low as 0.1 volt, and it is also susceptible to disturbances in the electromagnetic environment.

The conventional techniques have encountered the problems of head clearance measurement of the order of 0.1 μm in the above-mentioned respects. The foregoing techniques do not comprehend the situation in which the clearance between the recording transducer and recording medium varies to the extent beyond control. In case of using a contact sensor or electrostatic capacity sensor, as mentioned above, the head clearance is measured in terms of the electrostatic capacity which is proportional on the first-order basis to the distance between the confronting conductors, and therefore it merely provides a same output variation for a same distance variation even if the distance to be measured becomes small, which imposes difficulty of control for a smaller clearance measurement in principle.

The following describes the general concept of field electron emission in relation to the foregoing prior art problems.

A necessary condition for the field electron emission to arise is to make an electric field to the extent of about $10^8$ V/m or more (the field strength depends on the material and surface condition of the conductor) on the surface of a conductor which has a negative voltage value with respect to the surrounding. Generally, field electron emission is induced in a vacuum by application of several thousand volts to the sharp tip of a metallic needle so that a large electric field is produced at the needle tip. FIG. 1 explains the mechanism of field electron emission. In the figure, when a strong electric field 102 is produced on the surface of a conductor 101 at the tip of a metallic needle, the electric field 102 penetrates into a conductor surface region 104, causing the energy potential distribution outside of the conductor and in the conductor surface region 104 against free electrons 103 in the conductor to vary from the state shown by the dashed line 105 to the state shown by the solid line 106. Consequently, a very thin energy barrier 107 attributable to the work function emerges, and the free electrons 103 in the conductor penetrate the energy barrier 107 by the tunneling phenomenon based on quantum mechanics (Schottky tunnel effect) to form a field electron emission current 109 into the free space as shown by the arrow 108. Alternatively, as shown in FIG. 2, when two conductors 111 and 112 are spaced out by a gap 113, with a potential difference being made between the conductors (shown as a step 115 of the energy potential distribution of free electrons in the conductors 111 and 112 in the figure), a large electric field 116 is produced. The electric field causes the energy potential distribution to vary from the state shown by the dashed line 117 to the state shown by the solid line 118. A thin energy barrier 120 is created in a surface region 119 of the conductor 111 having a negative voltage, and if the potential difference between the two conductors is greater than the work function of the conductor 111, the Schottky tunnel effect 108 emerges to produce a field electron emission current 109 (in FIG. 1, a lower step of electron potential distribution in the conductor and those shown by 121 and 122 in FIG. 2 are steps attributable to the work function of the conductor).

Another method of inducing the quantum mechanical tunneling phenomenon in a small gap between two conductors is as shown in FIG. 3. In this case, conductors 124 and 125 are disposed with a small gap 123 provided between them, and a voltage is applied so that a potential energy difference 128 smaller than work functions 126 and 127 of both conductors shown by the electron potential distribution 137 is created. When the gap 123 is sufficiently small (typically 1 nm or less), the energy barrier 131 created from the surface region 129 of conductor 124 to the gap 123 and to the surface region 130 of conductor 125 becomes sufficiently thin, causing free electrons 133 in the conductor to penetrate as shown by the arrow 132 due to the quantum mechanical tunneling phenomenon to produce a tunnel current 134. In this case, however, if one of conductors is covered on its surface with a nonconductor dielectric) 135 as shown in FIG. 4, an energy barrier 136 having a virtually infinite height is created at a portion of the dielectric 135 at a midway point of the energy barrier 131, and the quantum mechanical tunneling phenomenon subsides and the tunnel current does not flow.

On the other hand, in the case of using the field electron emission effect, even in the presence of a dielectric substance 138 on the surface of the conductor 112 which does not have field electron emission, as shown in FIG. 5, an electric field 139 as strong as the electric field 116 of FIG. 2 is produced on the surface of the conductor 111, provided that the conductors 111 and 112 are given such a potential difference that the potential difference between the conductor 111 and the surface of dielectric 138 is greater than the work function of the surface of conductor 111, resulting in the occurrence of field electron emission as in the case of FIG. 2. Shown by the dashed line 140 in FIG. 5 is the electron energy potential distribution of FIG. 4 presented for comparison. The intensity of the current increases sharply as an exponential function of the increasing electric field strength on the conductor surface due to an increased potential difference or decreased spacing between the conductors, as will be described later. However, if the spacing is too small as in the case shown in FIG. 6, the depth 142 of a recess 141 of the electron energy potential distribution existing between the conductor 111 and dielectric 138 becomes shallower than the work function 121 of the conductor 111 as shown in FIG. 6, and the quantum mechanical tunneling phenomenon at the energy barrier of the conductor surface region 119 subsides.

SUMMARY OF THE INVENTION

This invention is intended to deal with the foregoing problems in consideration of the field electron emission and tunneling phenomenon, and its prime object is to provide a recording transducer clearance measuring apparatus which is stable against electrical noise and inexpensive in measuring a clearance (lift) of 0.1 μm or less of a recording transducer such as a magnetic head over a recording medium in the atmosphere instead of a vacuum environment even in case the recording medium surface is coated with a dielectric substance.

Another object of this invention is to provide a recorder capable of varying the distance of a gap between the recording head and recording medium.

A further object of this invention is to provide a method of controlling the distance of a gap between the recording head and recording medium stably against electrical noise and also easily.

A further object of this invention is to provide a method of controlling the recorder capable of protecting the recorder itself and the record on the recording medium when the clearance between the recording head and recording medium varies to the extent of abnormality.

With the intention of overcoming the foregoing problems, the inventive recording head clearance measuring apparatus comprises a field electron emission electrode section including at least one electrode which creates an electric field in a space between the recording transducer carrier surface confronting the recording medium and the conductive section of the recording medium so that the electric field induces the field electron emission, a voltage source which applies to a space between the electrode section and recording medium conductive section a voltage that is greater, at least at its peak, than the work functions of the electrode section confronting the recording medium and the recording medium conductive surface, a current measuring device which measures the field electron emission current flowing through the electrode section, and a computation processor which calculates the distance of a gap between the field electron emission electrode section and the recording medium, i.e., the amount of clearance or lift of the recording transducer carrier over the recording medium, from the value of the current detected by the current measuring device.

The inventive apparatus based on the above basic arrangement comprises a plurality of field electron emission electrodes on the recording transducer carrier surface confronting the recording medium, so that the attitude of the transducer carrier with respect to the recording medium is recognized.

The inventive apparatus based on the above basic arrangement has its field electron emission electrode section supported by the recording transducer carrier through a position adjusting mechanism, so that the electrode section approaches to or retreats from the recording medium thereby to recognize the condition of a dielectric substance on the recording medium surface.

The inventive apparatus based on the above basic arrangement has its field electron emission electrode section covered on the surface confronting the recording medium with a protection device made of a dielectric substance.

The inventive apparatus based on the above basic arrangement has its field electron emission electrode section exposed to or sealed from the recording medium by the protection device.

The inventive apparatus based on the above basic arrangement has its field electron emission electrode section formed of a plurality of electrodes arranged such that each electrode has a same height or a different height with respect to the recording medium surface, with an equal voltage or a different voltage or a different work function being given to each electrode.

The inventive recorder with the provision of the recording head carrier based on the above arrangement comprises a recording transducer on the surface of a recording head carrier confronting a recording medium for recording and/or reproducing data on the recording medium, and the computation processor operates on the position adjusting mechanism in accordance with the calculated distance of the gap between the field electron emission electrode section and the recording medium, i.e., the clearance of the head carrier from the recording medium.

The inventive recorder has its position adjusting mechanism operative to control the positions of the field electron emission electrode section and the recording transducer independently.

The inventive recorder comprises an electrical conversion means which converts the field electron emission current detected by the current measuring device into data by which the position adjusting mechanism is controlled.

The inventive control method for the recorder comprises the operational steps of generating an electric field on the surface of the field electron emission electrode confronting the recording medium in terms of a function of the distance between the electrode section and the recording medium, measuring the change in the quantity of electricity which is lost at the electrode section due to the field electron emission occurring between the electrode section and recording medium, controlling the distance of a gap between the recording transducer and recording medium in accordance with the change in the quantity of electricity, and altering the recorder operation, e.g. halting its operation, in response to a distance in excess of a preset threshold, thereby preventing damage to the recorder or the loss of a record on the recording medium.

DESCRIPTION OF THE PREFERRED EMBODIMENTS

Embodiments of this invention will be described with reference to the drawings.

Figure 7:
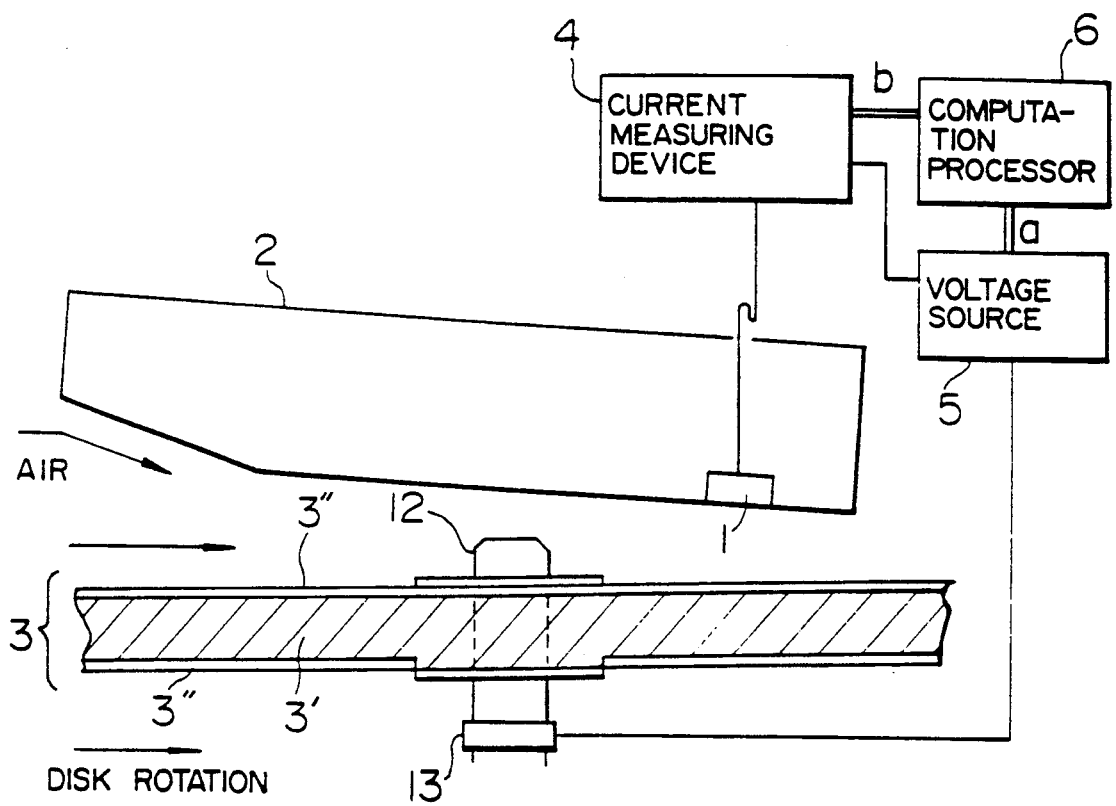
FIG. 7 is a diagram showing the systematic arrangement of the recording head clearance measuring apparatus embodying the present invention.

FIG. 7 shows an embodiment of the inventive recording head clearance measuring apparatus applied to a magnetic head carrier. Shown in the figure is a magnetic disk 3 as an example of a conductive recording medium, and a magnetic head carrier 2 is supported by a proper supporting mechanism such as a spring support (not shown) over the magnetic disk 3 so that it traverses the disk with a clearance being made between them. The magnetic disk 3 is turned by being mounted on a spindle 12 which is coupled to a driver (not shown). Provided on the magnetic head carrier 2 on its surface confronting the magnetic, disk 3 is a field electron emission electrode section 1, which is connected to a current measuring device 4 disposed in a proper location in the magnetic disk drive unit. The current measuring device 4 is supplied with a voltage by being connected to one terminal of a constant voltage source 5, which has another terminal connected to a rotary joint 13 fitted on the spindle 12. Both of the current measuring device 4 and voltage source 5 are connected to a computation processor 6 so that they can exchange data with each other.

The recording medium shown in FIG. 7 as a case of a magnetic disk is generally formed of a conductor, which may be exposed in part or in its entirety on the surface, as seen among a variety of types of magnetic drums, floppy disks, magnetic tapes, etc. The illustrated magnetic disk 3 is coated on its base disk 3' with a certain protection film 3''. In case the entire surface of the disk 3 is coated with the protection film 3'', as shown for the upper side of disk in the figure, the disk 3 can have electrical continuity to the voltage source 5 by way of the contact section between the disk center hole and spindle 12 and the rotary joint 13. Alternatively, in case the protection film 3'' is absent in the disk central section in contact with a metallic mount of the spindle 12, as shown for the lower side of disk in the figure, this section provides the disk 3 with electrical continuity to the spindle 12.

Figure 9:
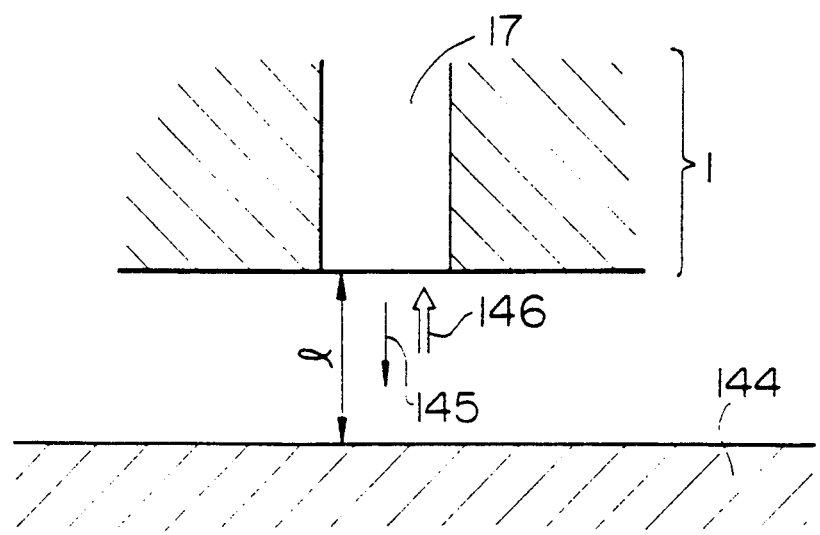
FIGS. 9 to 16 are diagrams used to explain the principle of measuring the distance between the field electron emission electrode section and recording medium.

The head clearance measuring apparatus operates as follows. FIGS. 9 to 13 show in detail the portion of the field electron emission electrode section 1 and the principle of clearance measurement. Shown in FIG. 9 is the case where the magnetic disk 3 as a recording medium (or it may be a model of recording medium) has a conductive surface 144. An electric field 146 acts on the surface of a field electron emission electrode 17 incorporated in the field electron emission electrode section 1, and a field electron emission current 145 is produced. For a distance of a gap l from the electrode 143 to the recording medium at one time point having a potential difference to produce an electric field 146 of E, and for an intensity of field electron emission current 145 of I at this time point, there are the following relations among the three variables.

$$I = C_1 \frac{E^2}{\phi} \exp(-C_2 \phi^{3/2}/E) \quad (1)$$

$$E = V/l \quad (2)$$

where V is the potential difference between the electrode 17 and recording medium 3, $\phi$ is the work function of the surface of electrode 17, and $C_1$ and $C_2$ are constants determined from the shape and area of the electrode. Accordingly, the distance l is evaluated by measuring the intensity of current I.

Figure 10:
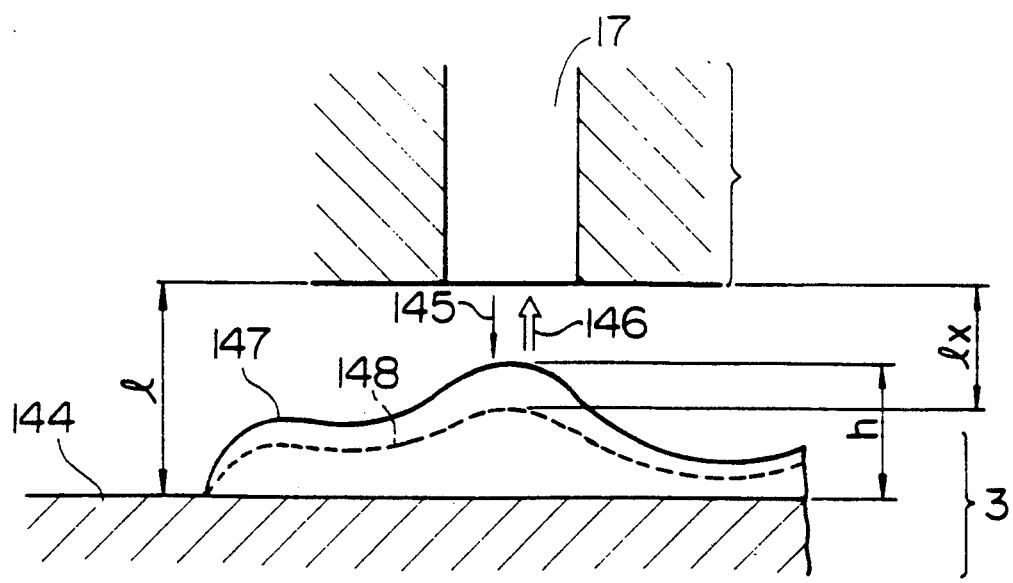

Next, when the conductor 144 of the recording medium 3 is overlaid by a dielectric substance 147 as shown in FIG. 10, the field strength E over the recording medium conductor 144, the distance l between the electrode 17 and conductor 144, the relative dielectric constant K of the dielectric 147 and its thickness are related as follows.

$$E = \frac{-V}{l - h(1 - 1/K)} \quad (3)$$

Figure 11:
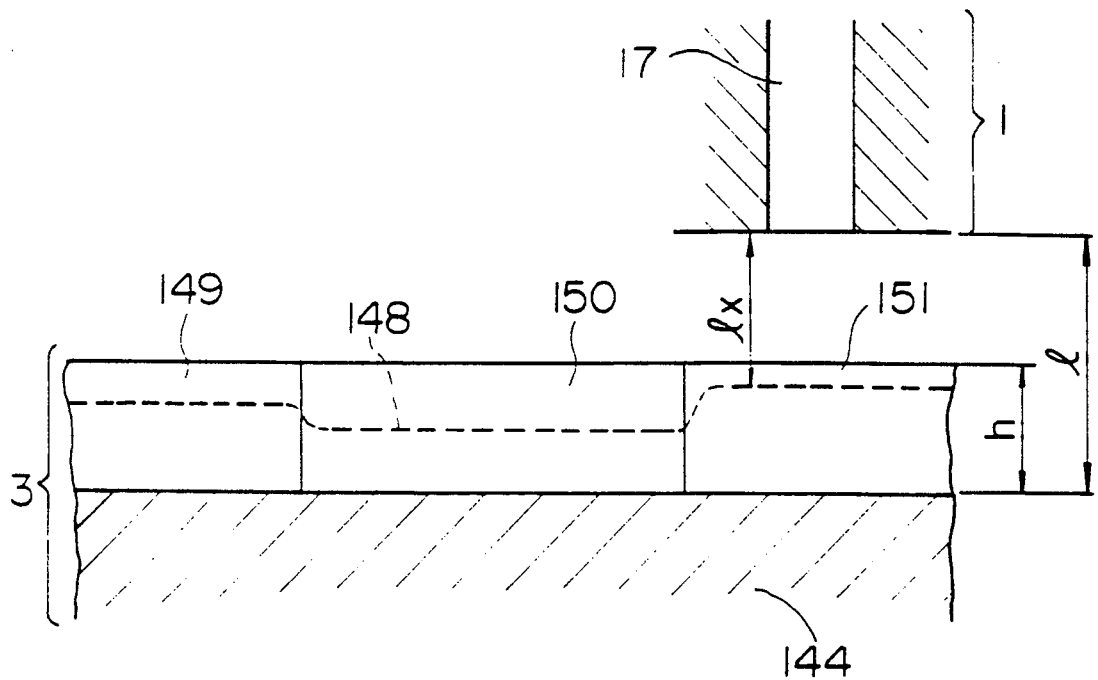
Figure 12:
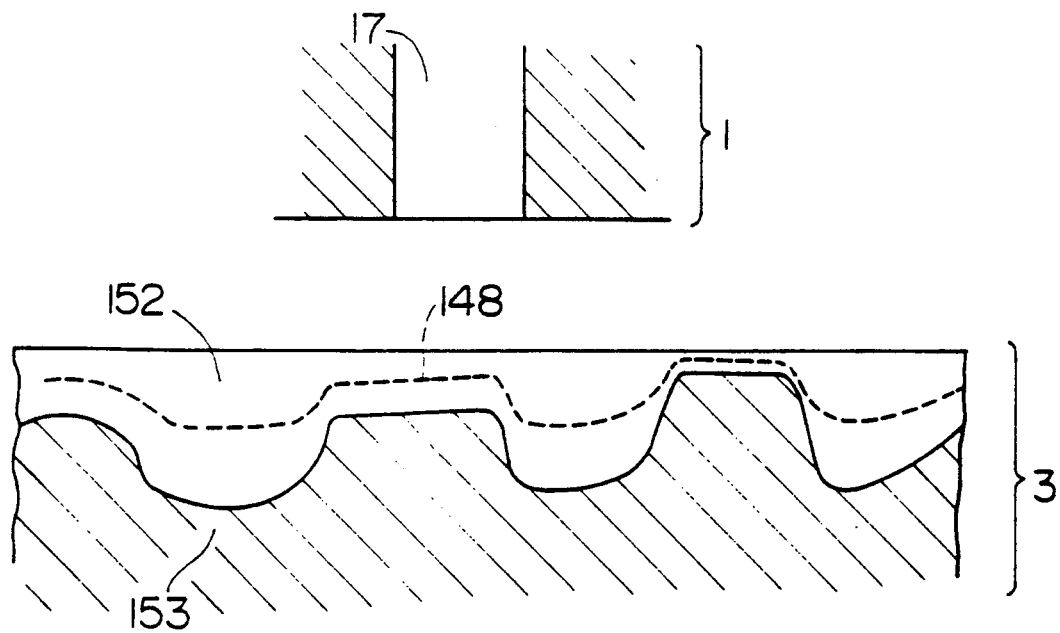

Using this equation in combination with equation 1, the clearance is measured, as $lx = l - h(1 - 1/K)$ for the case where the presence of the dielectric substance is known through the conversion of the field electron emission current intensity to the distance. If l is constant and the dielectric constant is known, the thickness h of the dielectric substance can be known. No problem will arise when the thickness h of the dielectric substance divided by its relative dielectric constant K, i.e., value h/K, is sufficiently smaller than 1 in a practical sense. Shown by the dashed line 148 in the figure is the locus of lx. Conversely, as shown in FIG. 11, when the variation of thickness is sufficiently small, substances 149, 150 and 151 with different dielectric constants exist, and the clearance is constant (obtained by the averaging process for several turns of the recording medium), the dielectric constant can be measured from the thickness h of the dielectric substance. In addition, when a substance 152 of a known dielectric constant having a flat surface covers a dielectric substance 153 having a non-flat surface, as shown in FIG. 12, information on the surface shape of the dielectric substance 153 can be obtained in the same manner.

Figure 13:
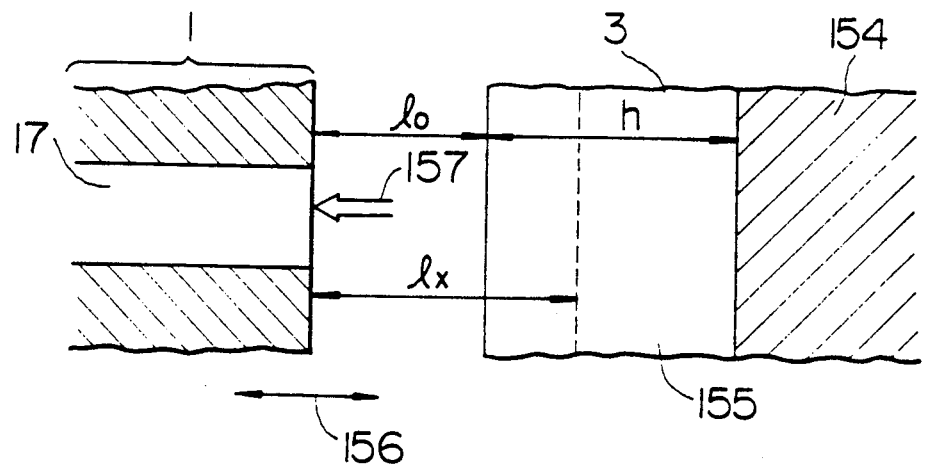

The following deals with a generic case as shown in FIG. 13 in which the dielectric substance 154 is overlaid by another dielectric substance 155 having a dielectric constant K and a thickness h, which confronts the electrode 17 of field electron emission electrode section 1 of the magnetic head carrier 2 with a clearance of $l_0$ between them. The dielectric constant of the dielectric substance 155 on the recording medium is virtually known in many cases. The measurement of the case of a known relative dielectric constant K and unknown clearance $l_0$ and thickness h of dielectric substance is conducted as follows. As a first method, the electrode 17 is moved as shown by the arrow 156, with the potential difference between the electrode and conductor 154 being unvaried, so as to vary the $l_0$. The strength E of the field 157 on the electrode surface varies with the potential difference V in the following first-order approximation.

$$E = \frac{V}{l_0 + h/K} \quad (4)$$

Figure 1:
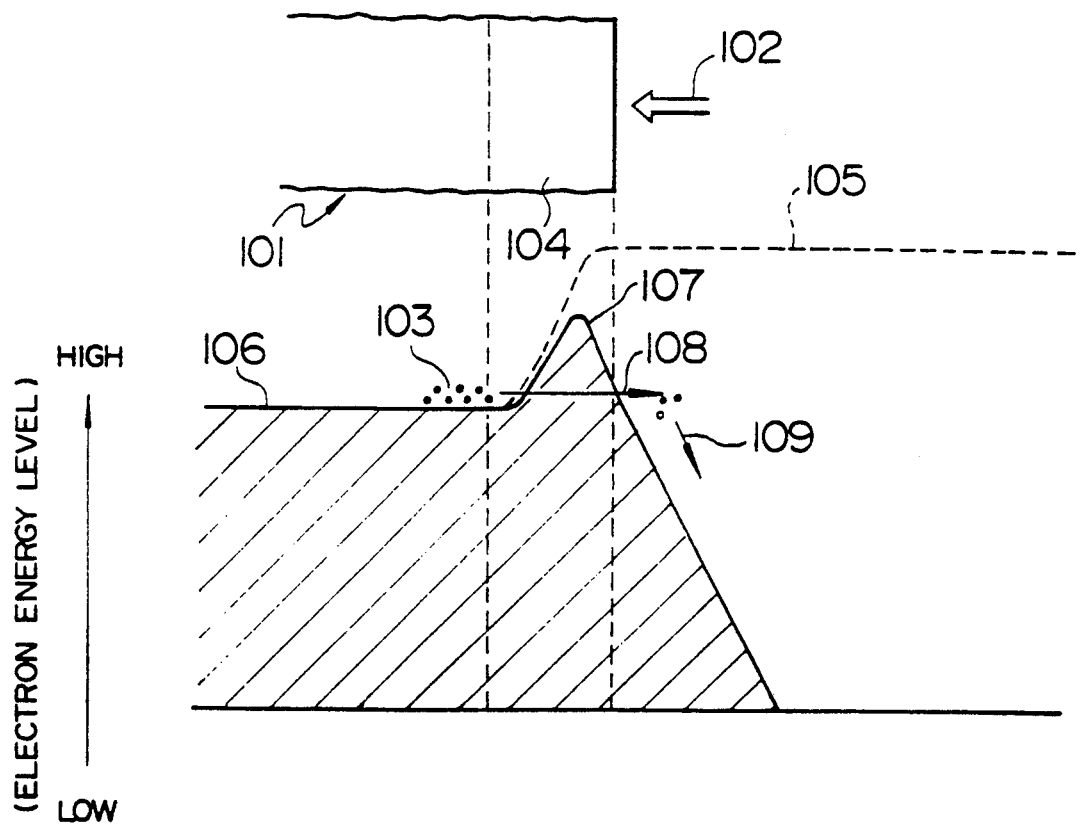
FIGS. 1 to 6 are diagrams showing the field electron emission phenomenon and the tunneling phenomenon between confronting metallic electrodes, both phenomena providing the basis of this invention.
Figure 2:
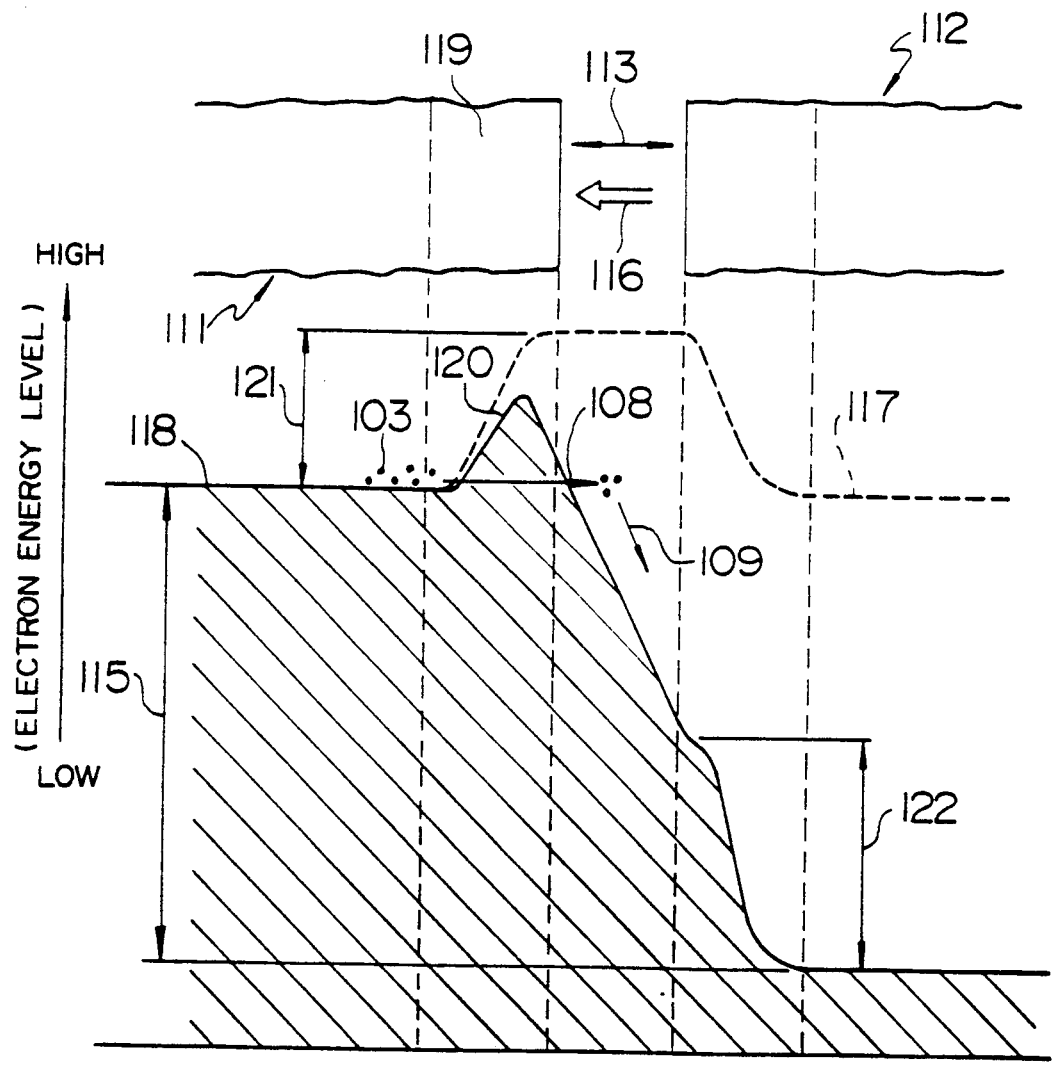
Figure 3:
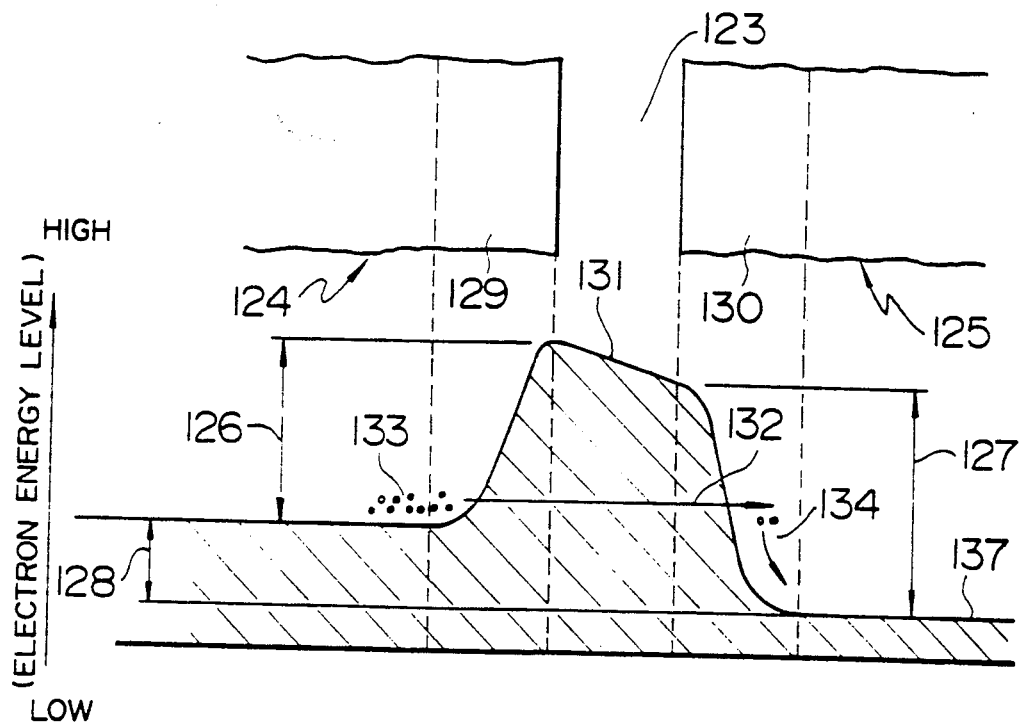
Figure 4:
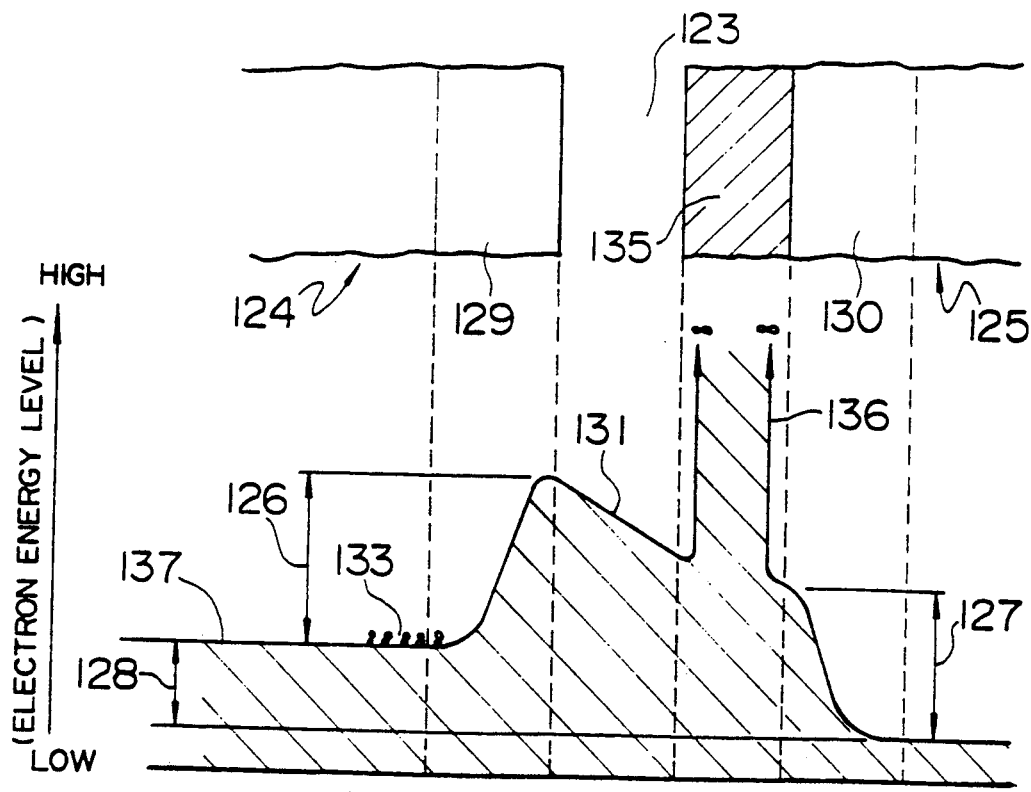
Figure 5:
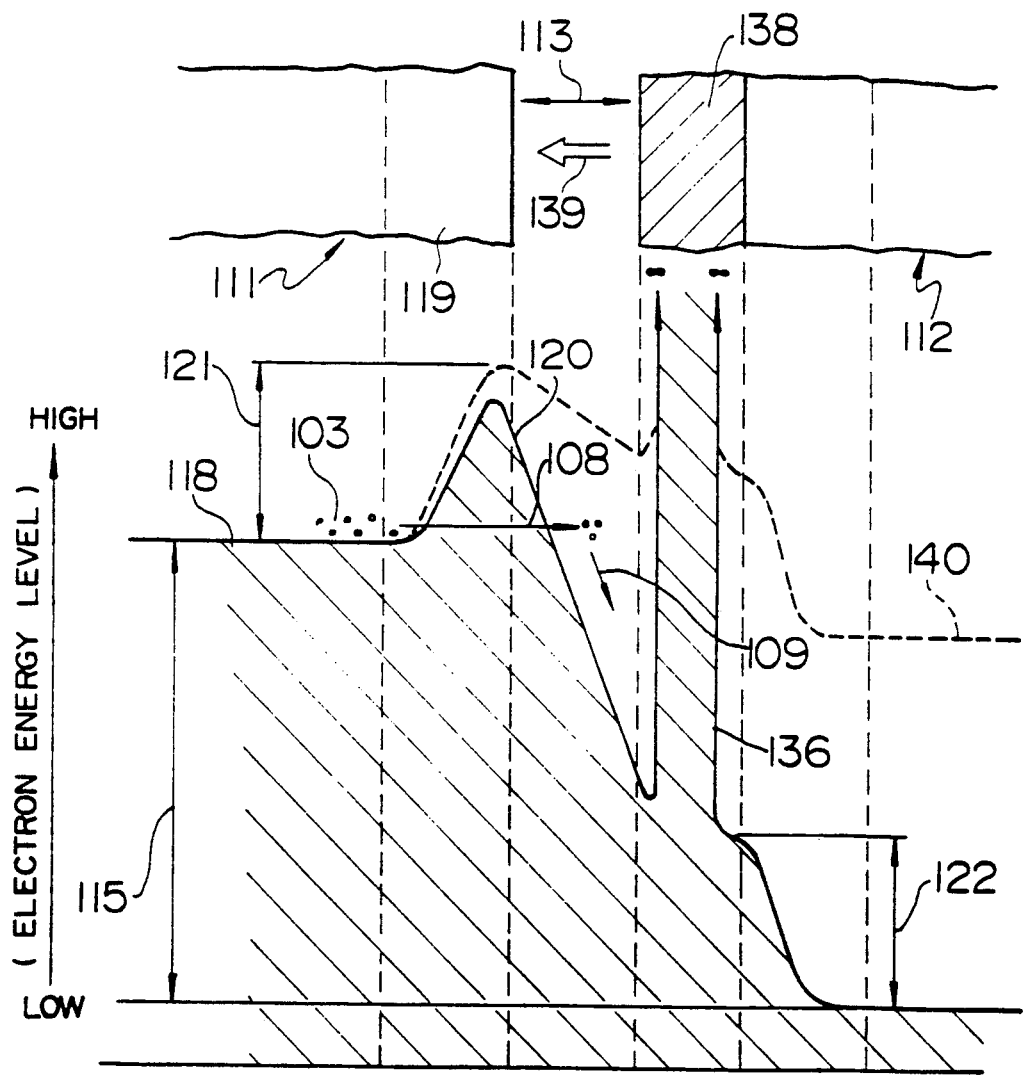
Figure 6:
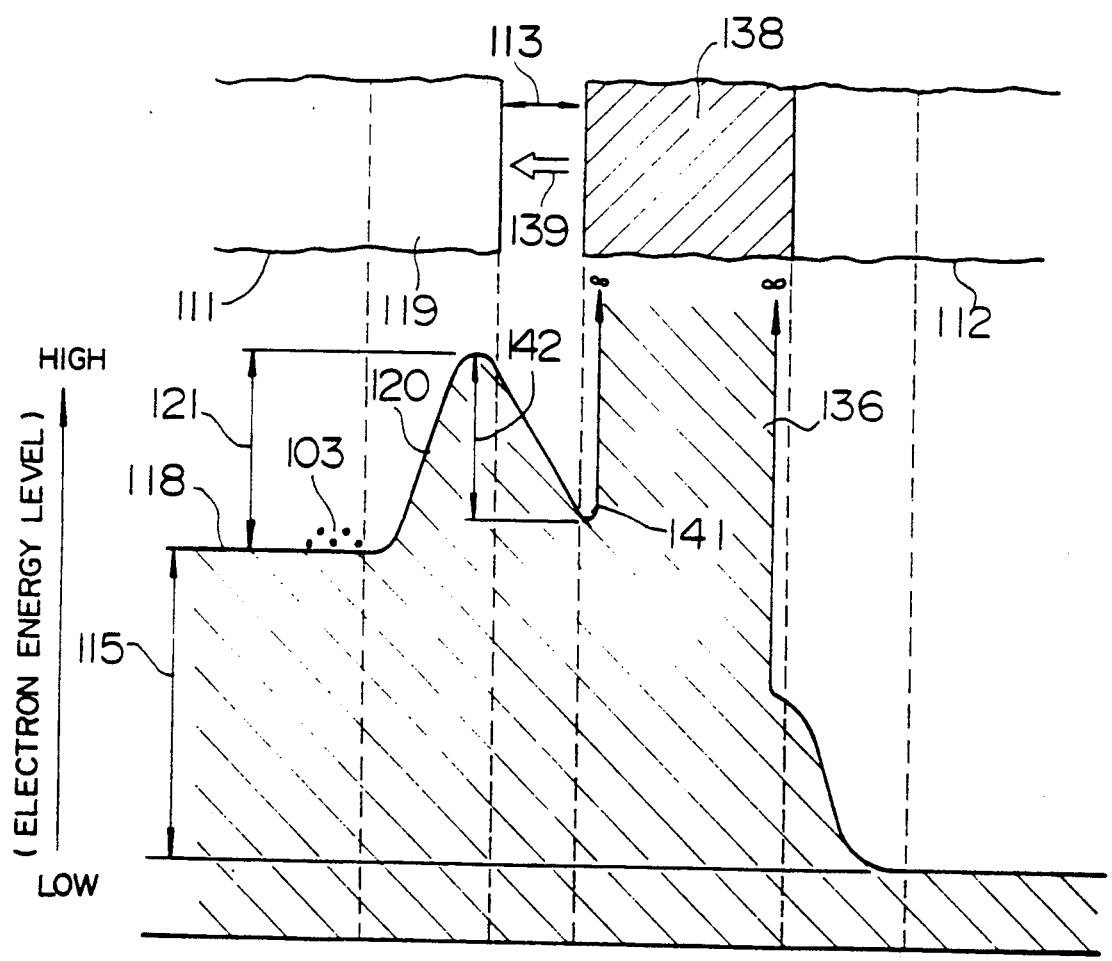
Figure 14:
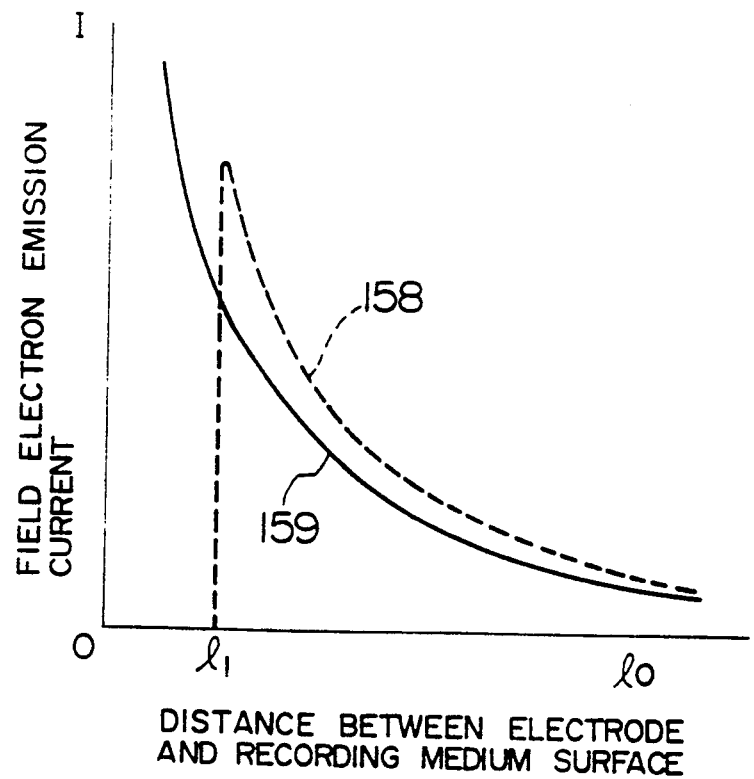

Namely, when the distance $l_0$ is made smaller, the strength E of electric field 157 increases and the intensity of field electron emission current increases sharply along the exponential curve of equation 1. However, referring to FIG. 6, if a dielectric substance exists on the recording medium surface, causing the clearance between the recording medium and electrode to be too small, the energy potential distribution of electrons existing between electrode 17 and dielectric substance, 155 has a recess, 142 becoming shallower than the work function 121 of electrode 17, and the quantum mechanical tunneling phenomenon at the energy barrier on the surface of the electrode 17 subsides and the field electron emission current goes off. FIG. 14 shows, in the sense of a model, the relation between the field electron emission current intensity I end the gap $l_0$. Shown by the solid line 159 is the case where the recording medium surface is not covered by a dielectric substance and the current I increases simply as the distance $l_0$ decreases, whereas in the case with a dielectric substance on the recording medium surface as shown by the dashed line 158, the current intensity I increases with the decrease of the distance $l_0$ and it falls to zero suddenly at a certain distance $l_1$. At this maximum distance $l_1$ for the subsidence of field electron emission current, the electron potential energy equivalent to the potential difference between the dielectric substance surface and the electrode has an equal value to the work function on the surface of electrode 17. Namely, equation 4 gives the work function $\phi$ eV (electron volts) on the electrode surface as the following function.

$$\phi = \frac{l_1}{l_1 + h/K} \cdot V \tag{5}$$

For the maximum current value $I_1$ immediately before the field electron emission current goes off, equations 1 and 4 give:

$$\ln\left(\frac{I_1\phi}{C_1}\right) = 2 \ln\left(\frac{V}{l_1 + h/K}\right) - \frac{C_2\phi^{3/2}(l_1 + h/K)}{V} \tag{6}$$

From equations (6) and (5):

$$\ln\left(\frac{I_1\phi}{C_1}\right) = 2 \ln\left\{\frac{K}{h}(V - \phi)\right\} - \frac{C_2\phi^{3/2}h}{K(V - \phi)} \tag{7}$$

In equation (7), the only unknown value is the thickness h of the dielectric substance in FIG. 13, and it can be calculated from the measured value of $I_1$ using the equation (7). Then from the value of h, the value of $l_1$ can be evaluated. In case the electrode and recording medium are kept at a constant distance and the potential difference V is varied periodically as shown by the curve 160 in FIG. 15, the field electron emission current intensity I varies smoothly to zero until the absolute voltage value goes below a certain value when the recording medium surface is a conductor as shown by the curve 161 in the middle of FIG. 15. If the recording medium surface is covered by a dielectric substance, the field electron emission subsides suddenly at a time point when the potential difference between the dielectric surface and electrode has become equal in magnitude to the work function on the electrode surface, as mentioned above, resulting in a current waveform shown by the curve 162 at the bottom of FIG. 15. Therefore even for the same voltage and same intensity of field electron emission current, the presence or absence of a dielectric substance on the surface and information on the dielectric substance can be obtained from the manner of current subsidence and the current conduction time.

Figure 16:
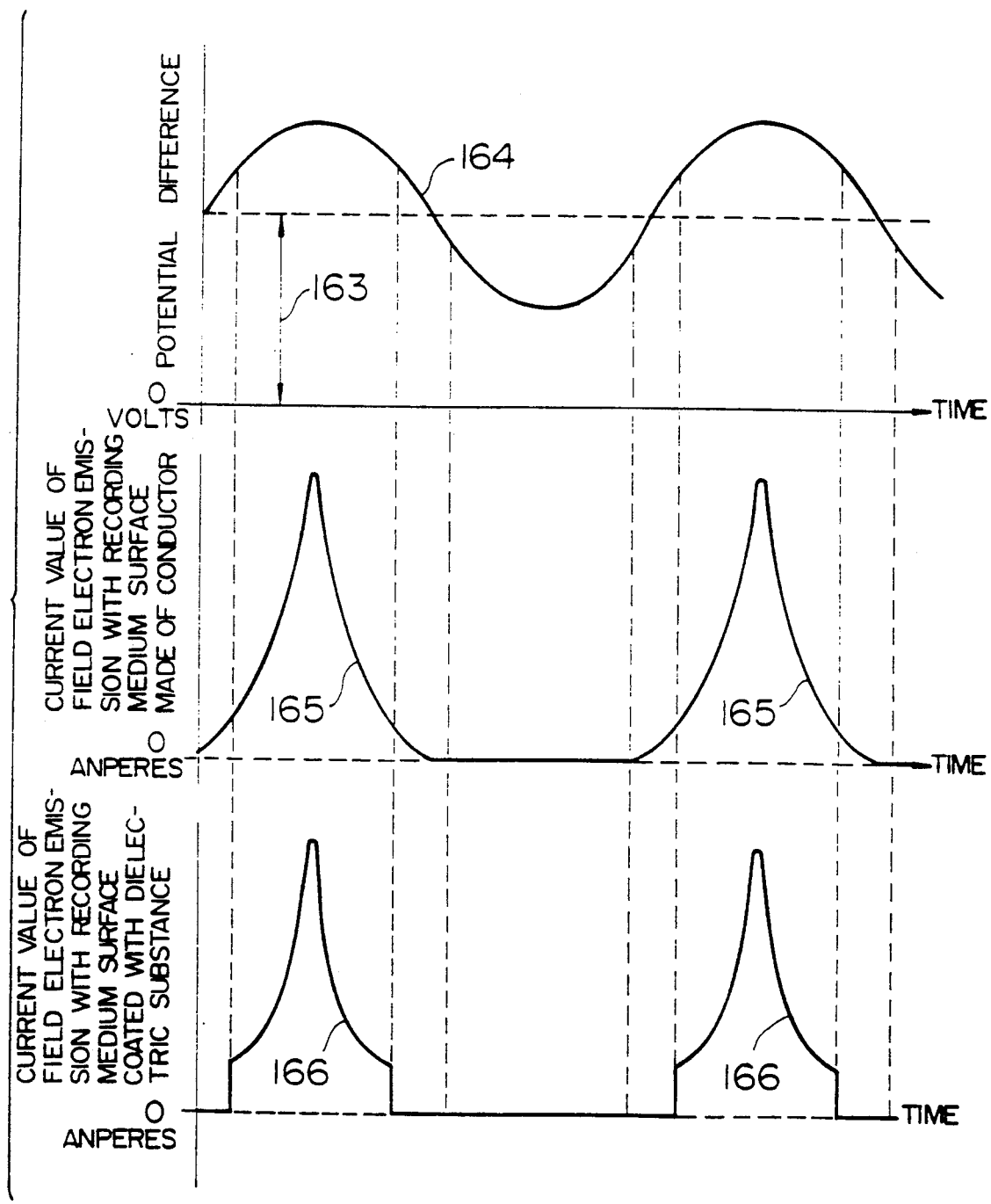

As shown in FIG. 16, when a bias potential difference having a bias 163 is varied in a certain period as shown by the curve 164, the difference of virtually the same waveform except for the reversed current appears on the current variation curve 165 of the case with a conductive recording medium and the current variation curve 166 of the case with a dielectric substance on the recording medium surface. Accordingly, in the presence of the same potential difference between the electrode and recording medium conductor and the same field electron emission current intensity, the application of the above-mentioned method reveals the presence or absence of a dielectric substance of the recording medium and the thickness and dielectric constant of the dielectric substance. In this case, the surface potential can be cancelled, and the load to the circuit is small.

Figure 15:
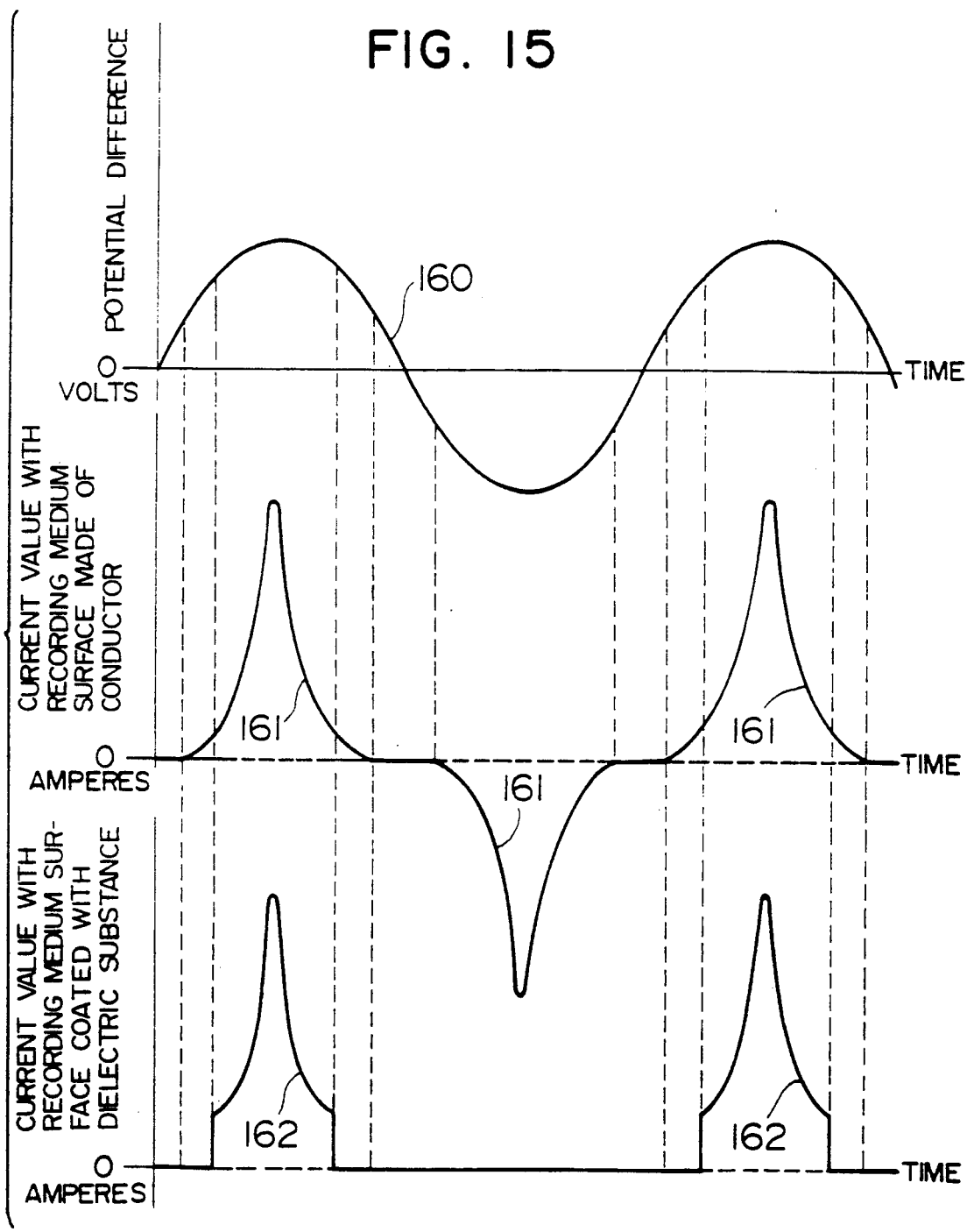

The measuring voltage from the voltage source 5 can be a constant voltage, or a variable voltage can also be supplied depending on the purpose of measurement as shown in FIGS. 15 and 16. The voltage adjustment can be done through the provision of an function within the voltage source 5, or the voltage adjustment can be programmed in the processor 6 in addition to the control for other devices.

This method for knowing the property of a dielectric substance on the recording medium surface is particularly effective for the initialization of the recording apparatus at start-up. The reason is that the recording medium is coated with a dielectric substance with the intention of enhancement of performance or protection in most cases, and the dielectric substance is designed to have a dielectric constant and thickness within certain ranges, and once the thickness and dielectric constant of the dielectric substance on the recording medium surface are measured using the above-mentioned method or their consistence with given data is confirmed at start-up, the clearance between the recording transducer and recording medium is measured in consideration of the thickness and dielectric constant of the dielectric substance on the recording medium surface and control using the measured value is conducted.

Figure 17:
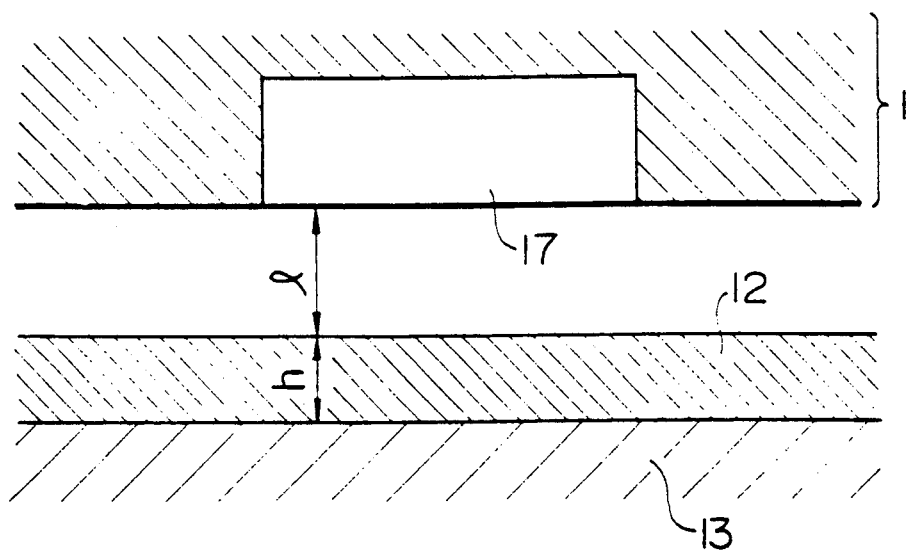
FIG. 17 is a diagram showing an embodiment of the mechanism for varying the distance between the recording transducer and recording medium.

The following embodiments are the case where the conductive recording medium is covered on its entire surface with a dielectric substance having a certain constant thickness. As shown in FIG. 17, where the clearance at the electrode 17 is l and the thickness of the surface dielectric substance 12 of dielectric constant K at this position is h, when the potential difference between the field electron emission electrode and recording medium conductor 13 is V volts, the electric field strength E at the surface of the electrode 17 is given by $E = V/(l + h/K)$, and for a clearance $l = 20$ nm, relative dielectric constant $K = 3$, thickness of dielectric substance $h = 30$ nm, and potential difference of 60 V, the E is evaluated to be $2.0 \times 10^9$ V/m. Using Fowler-Nordheim's formula:

$$J_0 = 1.54 \times 10^{-6} \frac{E^2}{\phi} \exp\phi\left(-6.83 \times 10^7 \frac{\phi^{3/2}}{E}\right)$$

(where $J_0$ is the current density in A/cm², E is the electric field strength in V/cm, and $\phi$ is the work function of electrode 17 in eV) for the case of an electrode work function of 3.0 eV, $J_0$ is approximately 4.0 A/cm². When the electrode has a size of 10 $\mu$m square, the field electron emission current has a value of 4.0 $\mu$A. When l decreases by 1 nm, the current value becomes 7.8 $\mu$A. When l decreases by 0.1 nm, the current value increases by about 7.8% to 4.3 $\mu$A. The measurement of current of the order of microamperes can readily be done at a low cost today. Accordingly, the field electron emission current can be measured easily at a low cost and stably against electromagnetic disturbances as compared with the measurement of a tunnel current of the order of nanoamperes. This is a specially crucial factor in measuring the clearance of the magnetic head carrier over the magnetic recording medium.

In the arrangement of the recording head clearance measuring apparatus illustrated in FIG. 7, the voltage source 5 for applying a voltage to the field electron emission electrode section 1 and recording medium 3 can be a device such as model M107 manufactured by SYSTRON DONNER, for example, or any other power source circuit having the same property as the M107 and a variable voltage control ability, provided that it supplies a certain constant voltage or a voltage with the characteristics shown in FIGS. 15 and 16.

The current measuring device 4 for the field electron emission current has a circuit resistance of 50 MΩ for measuring the field electron emission with an electrical resistivity of several tens of MΩ or higher and a current value of 1 μA at a 50-volt application, for example. This allows the use of a high-impedance amplifier which includes the current input preamplifier LI-76 (having an input impedance of 1 kΩ and a gain of $10^6$ V/A) manufactured by NF Circuit Block, for example, or any other electrical circuit equivalent to the LI-76. The amplified voltage output is digitized using such a device as Digitizing Module HP70700A manufactured by Hewlett-Packard, Ltd., for example, and processed to evaluate the head-medium clearance.

The protection film on the magnetic recording medium formed by sputtering has a thickness of several tens of nm or less, and it is also possible to form a magnetic body with a comparable thickness. For the achievement of higher density recording, both the protection film and magnetic layer are becoming thinner, and this embodiment is particularly effective for such a high-density innovation. It readily measures an extremely small clearance of several tens of nm or less at a satisfactory accuracy as mentioned above.

The work function of the electrode surface is $\phi = 2.1$ eV in case of an electrode made of strontium, or it is about 1.6 eV in case of a tungsten electrode coated with a monoatomic layer of barium, and some other elements and alloys can achieve work functions of 3 eV or lower. A greater value of $\phi$ is permitted by increasing the potential difference within the range in which discharging does not occur.

As has been mentioned previously, this invention is not confined to the use of a constant voltage source for the voltage source 5, but the voltage may vary. In this case, information about the dielectric substance on the recording medium surface can be obtained when the voltage varies. It also makes easy the determination of constants for the relation between the current and potential difference. The computation processor 6 shown in FIG. 7 receives the value of the field electron emission current over a data transfer path b and receives the value of voltage over a data transfer path a, and calculates the amount of clearance and information the dielectric substance on the recording medium surface from these data mainly on the basis of the equations 1 through 7. Some modifications may be made for the shape of electrode 17 depending on the purpose and difference of each apparatus. It is also possible for the processor 6 to incorporate programs for controlling the current measuring device 4 and voltage source 5.

Figure 8:
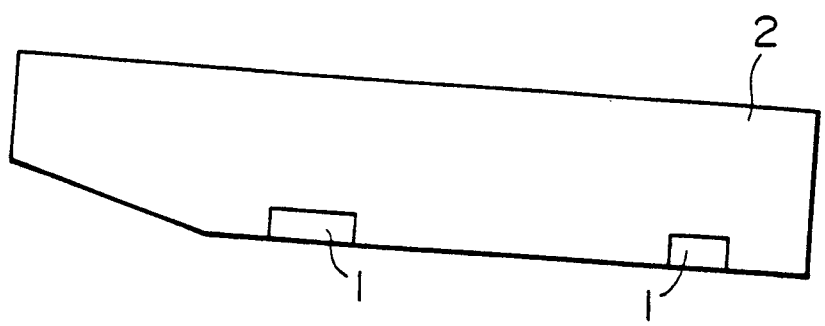
FIG. 8 is a diagram showing a variant of the magnetic head carrier.
Figure 18:
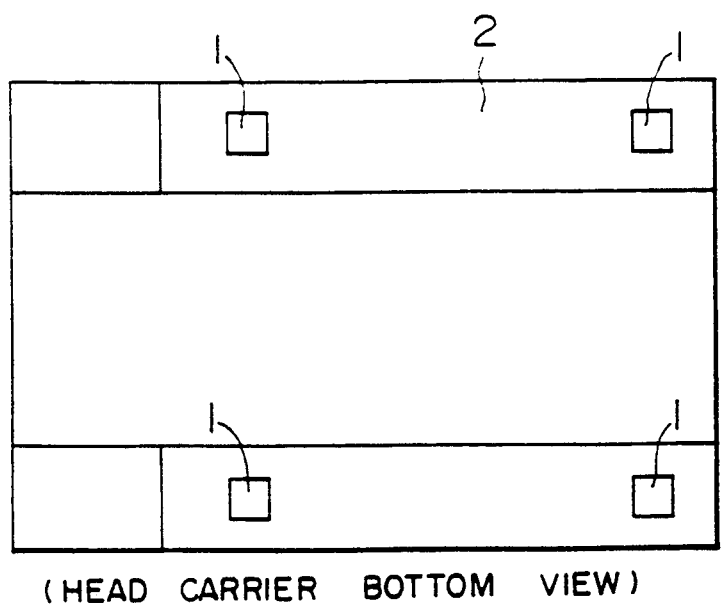
FIG. 18. is a diagram showing the bottom of the magnetic head carrier which is provided with the field electron emission electrode section in four locations.

Although the embodiment mentioned above includes only one field electron emission electrode section 1 there may be two electrode sections 1 at the front and rear of the magnetic head carrier as shown in FIG. 8, or two pairs of electrode sections 1 at the front and rear of the magnetic head carrier as shown in FIG. 18, so that a mean value of the detection results is used. In this case, it becomes possible to detect the attitude of the magnetic head carrier so that it is adjusted.

Figure 19:
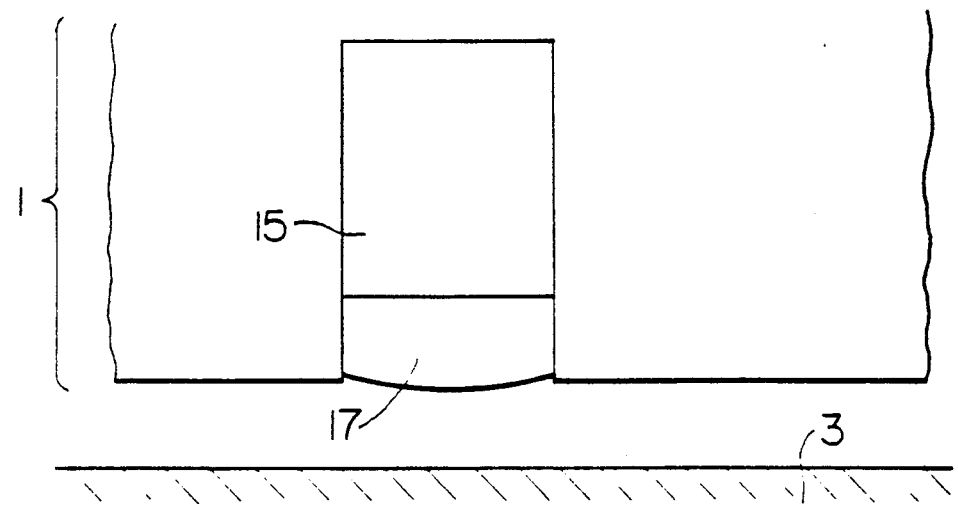
FIG. 19 is a diagram showing an embodiment of the field electron emission electrode section having a vertical movement mechanism.

The foregoing field electron emission electrode section 1 is fixed immovably to the magnetic head carrier. Alternatively, the electrode 17 is fitted on a fine vertical motion mechanism 15 as shown in FIG. 19 so that the clearance between the electrode 17 and recording medium 3 is varied by an arbitrary value thereby to get such information as the property of dielectric substance on the recording medium surface. An example of the fine vertical motion mechanism is a piezoelectric device, which provides the ability of length adjustment of the order of angstroms. The accuracy of measurement can be higher than that of the piezoelectric device by introduction of the interpolation scheme to the measured value.

Figure 20:
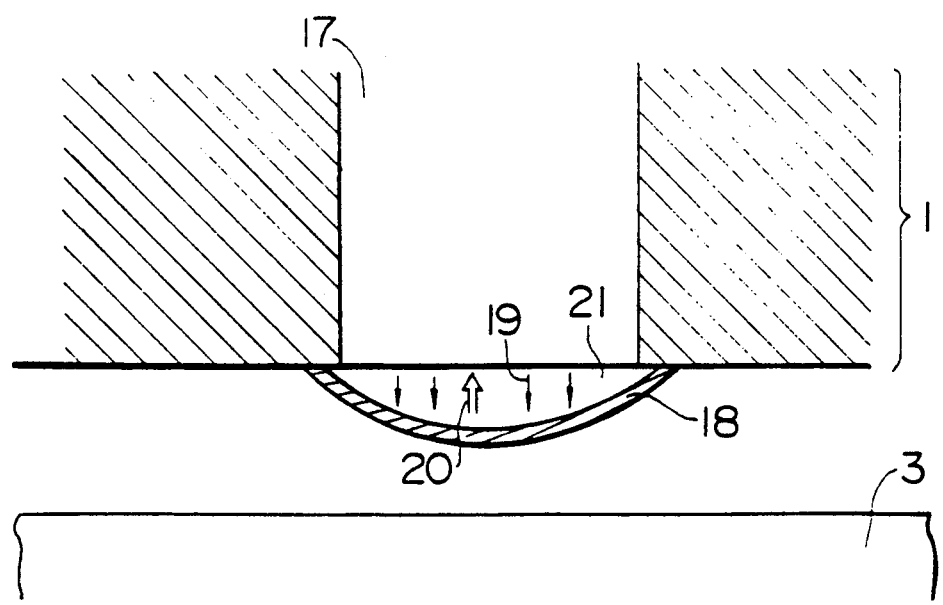
FIG. 20 is a diagram showing an embodiment of the field electron emission electrode section having a protection device.

Next, FIG. 20 shows an embodiment of the case where the electrode is covered for protection with a protection device 18. The protection device 18 is mainly formed of a dielectric material, and with the same potential difference as of the preceding embodiment being given between the conductor of recording medium 3 and electrode 17, an electric field 0 is generated on the surface of the electrode 17 and a field electron emission current 19 is created. For releasing charges of the field electron emission current, a conductive body is disposed on the surface of the protection device 18 on its face confronting the electrode, or the protection device 18 itself is formed of a conductive dielectric material so that it has electrical continuity to the outside.

Figure 21:
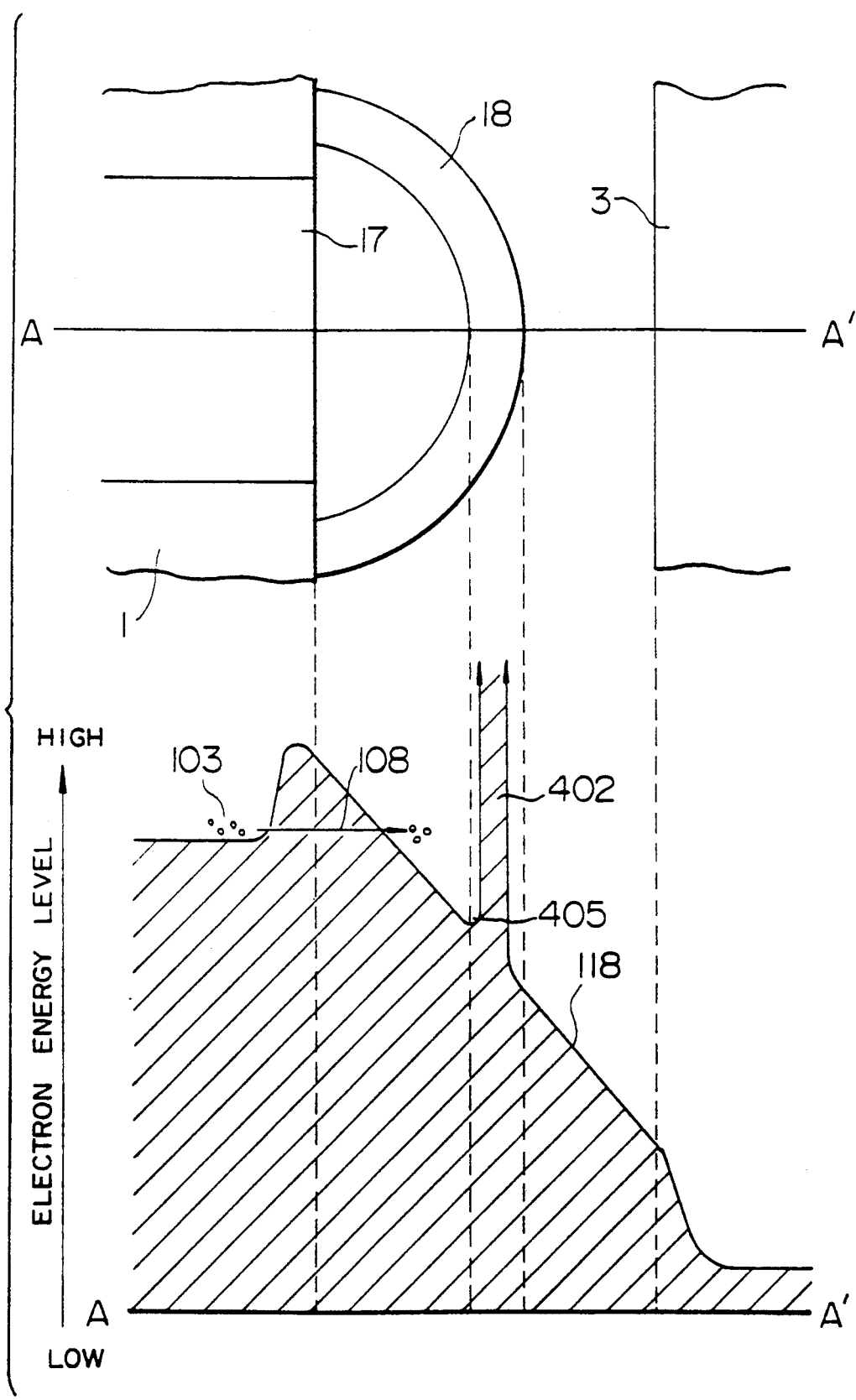
FIG. 21 is a diagram explaining the electron energy level in the arrangement of FIG. 20.

In case the electrode is covered with a protection device at least part of the electrode 17 needs to be separated from the protection device 18 as shown in FIG. 21. The electron potential distribution 118 with the application of a voltage between the electrode 17 and recording medium 3, indicated by the line, A—A', reveals that electrons 103 incur the Schottky tunnel effect 108 to produce a field electron emission current only when the peak potential value 405 caused by a very high potential barrier 402 created by the dielectric protection film is lower than the maximum level of electrons inside the electrode 17.

Figure 22:
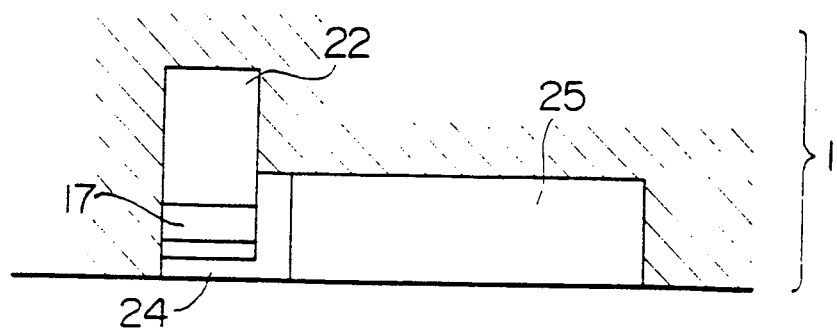
FIG. 22 is a diagram showing an embodiment of the field electron emission electrode section having a position adjusting mechanism and a electrode protection device.

Alternatively, as shown in FIG. 22, an electrode protection device 24 is fitted at the tip of an adjusting mechanism as made of a piezoelectric device, for example, so that the protection device 24 is closed when the head carrier is not afloat, the adjusting mechanism 25 is retracted after it is afloat, and an electrode vertical movement mechanism 22 made of a piezoelectric device for example is extended so that the electrode is moved to the specified position.

Figure 23:
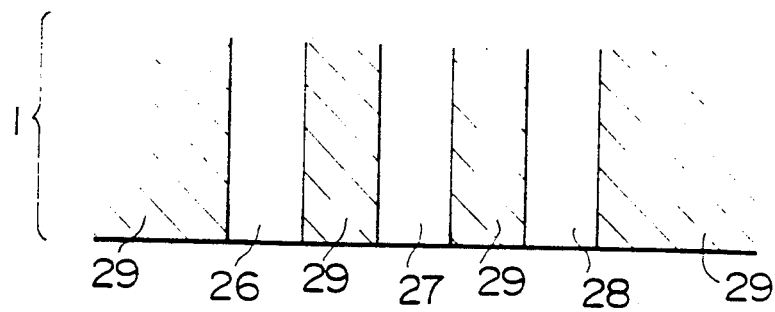
FIGS. 23 to 27 are diagrams showing embodiments of the field electron emission electrode section formed of a plurality of electrodes.

Another embodiment pertinent to the field electron emission electrode section 1 attached to the magnetic head carrier will be described with reference to FIGS. 23, 24 and 25. Shown in FIG. 23 are three electrodes 26, 27 and 28 having the same height interleaved by insulators 29. With the same potential being given to the electrodes 26–28, the measurement can be accurate and stable. With a different constant potential being given to each electrode, the measurement can be accurate, and the measurement based on multiple potential differences is a simplified method for obtaining information the dielectric substance on the recording medium surface by varying the potential difference between the electrode and recording medium mentioned previously, and this provides coarse information the dielectric substance on the recording medium surface. Application of different potentials has the same effect as varying the potential difference at three levels, and this is a simplified method for detecting the thickness and dielectric constant of the dielectric layer on the recording medium surface by varying the electric field on the electrode surface by varying the potential periodically as has been described previously. In this case, because of the concurrent measurement at multiple potentials, it offers continuous measurement, in contrast to the preceding embodiment in which the potential is varied periodically and therefore the position on the recording medium varies during the potential variation, causing the discontinuous measurement of the thickness and dielectric constant of the dielectric substance on the recording medium surface. The same effect is achieved by providing a different surface work function for each electrode, as it is obvious from Fowler-Nordheim's formula.

The minimum number of electrodes necessary for the embodiment of FIG. 23 is two, and the effect of the above-mentioned method increases as the number of electrodes increases.

Figure 24:
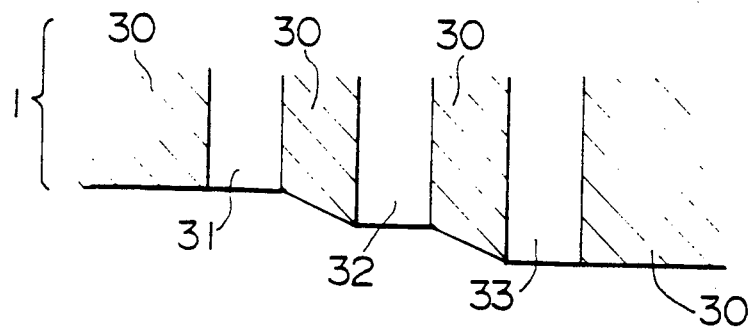
Figure 25:
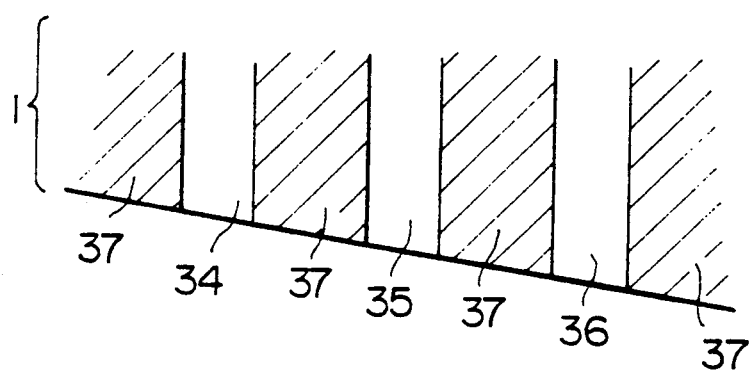

FIG. 24 shows an embodiment in which the field electron emission electrode section 1 includes; electrodes 31, 32 and 33 having different heights interleaved by insulators 30. This is a simplified method of the embodiment for varying the clearance of the electrode, providing an accurate measured value and coarse information about the dielectric substance on the recording medium surface, in contrast to the embodiment of FIG. 23 that is a simplified method of the embodiment which varies the electric field on the electrode surface. The embodiment of FIG. 24 also necessitates at least two electrodes. FIG. 25 shows an embodiment in which the field electron emission electrode section 1 made up of field electron emission electrodes 34, 35 and 36 insulated by insulators 37 has a slant surface, and it provides the same effect as the embodiment of FIG. 24 and, in addition, its simple shape facilitates manufacturing and the flat surface reduces the influence of the magnetic head carrier on its aerodynamic characteristics.

Figure 26:
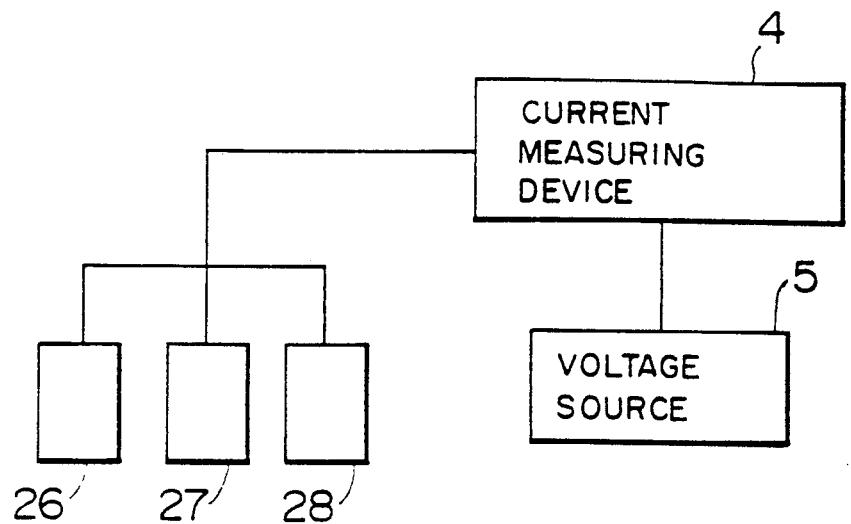
Figure 27:
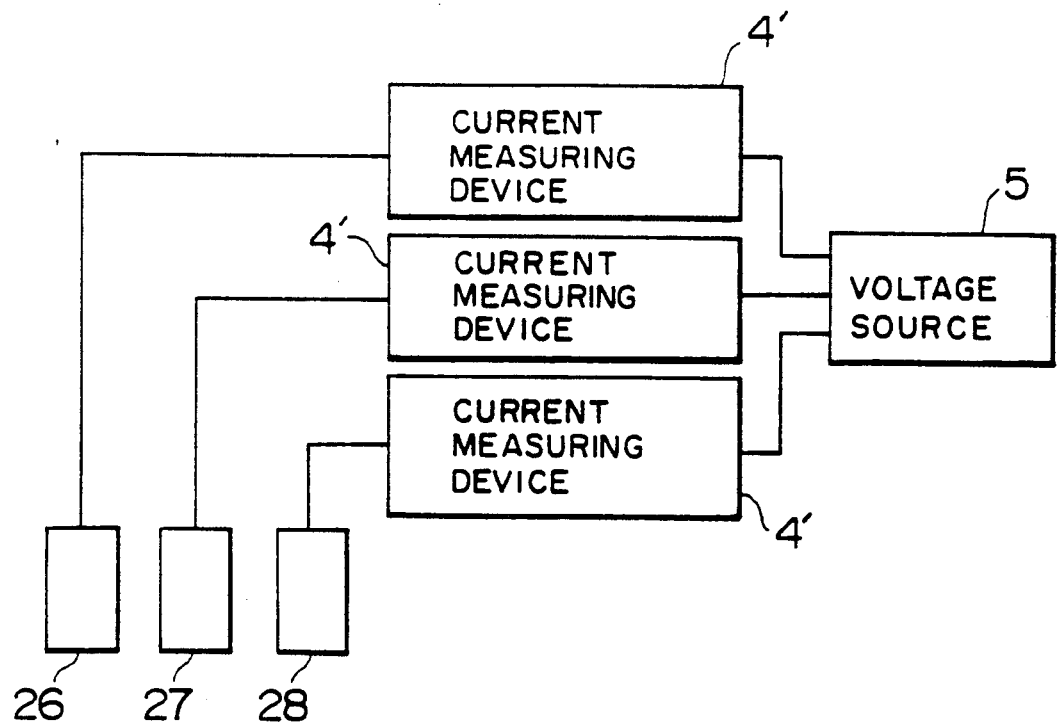

FIGS. 26 and 27 show examples of electrical connections for multiple electrodes. Shown in FIG. 26 is the case of electrodes having the same potential for the measurement by averaging the field electron emission currents. Shown in FIG. 27 is the connection among the electrodes, current measuring devices and voltage source for the case of different potentials, clearances to the recording medium and surface work functions of multiple electrodes, or the case of separate measurement of field electron emission current for each electrode even if the electrode condition is unique.

Figure 28:
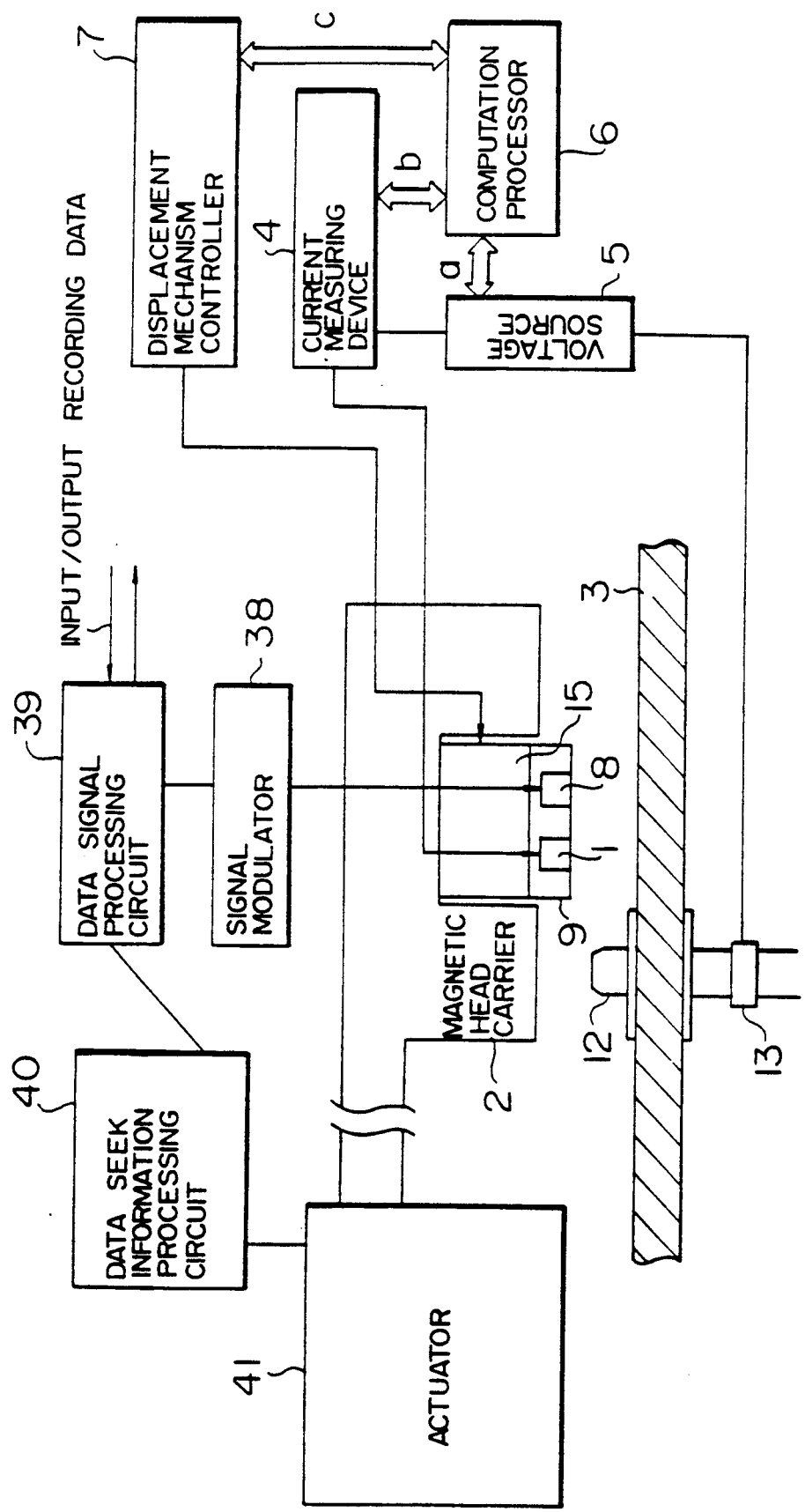
FIG. 28 is a block diagram showing the recorder embodying the present invention.

FIG. 28 shows an embodiment of the recording apparatus which uses the recording head clearance measuring apparatus. The recording apparatus is designed to write and/or read records on a magnetic disk 3 as a recording medium, with a spacing being provided between a magnetic head 8, as a recording transducer, and the magnetic disk. The recording head 8 constitutes a recording transducer device by being built in a recording transducer supporter 9 together with a field electron emission electrode section 1 (which will be termed an electrode section) made of a conductive material. The recording transducer supporter 9 is made of an insulator so that it isolates the electrode section 1 from the magnetic head 8 and from the outside, and it has a section for connecting the electrode section 1 and magnetic head 8 to the external electrical circuit.

The recording transducer supporter 9 is fixed to the magnetic head carrier 2 through a displacement mechanism 15, which varies the relative distance between the surface of the magnetic disk 3 and the electrode section 1 and magnetic head 8. The magnetic head carrier 2 is connected to an actuator 41 which is movable over the magnetic disk.

The recording apparatus is provided with a voltage source 5, current measuring device 4 and computation circuit in the same arrangement as the recording head clearance measuring apparatus shown previously in FIG. 7, and it is capable of applying a certain voltage between the electrode section 1 and magnetic disk 3 and measuring the current through a spindle 12 and rotary coupling 13. The computation processor 6 operates to calculate the amount of clearance between the magnetic head carrier 2 and the magnetic disk 3, i.e., the distance between the electrode section 1 and the magnetic head 8, in the similar manner. The recording apparatus is provided with a displacement mechanism controller 7 which is controlled by the processor 6, and the controller 7 operates the displacement mechanism 15 to adjust the amount of aerodynamic lift of the recording transducer supporter 9 against the magnetic disk 3, thereby controlling the clearance between the magnetic head 3 and magnetic disk 8.

The computation processor 6 can have stored programs, and it is connected to the power source 5, current measuring device 4 and displacement mechanism controller 7 through buses a, b and c for exchanging control signals for the adjustment of application voltage, calculation of current and conversion of clearance value.

Input/output data from arbitrary data input/ output devices (not shown) to the magnetic disk 3 is separated into a data signal and write (reproduction) control data by a data signal processing circuit 39. The data signal is supplied to the magnetic head 8 by way of a signal modulator 38. The control information pertinent to the writing or reproducing position is sent for processing to a data seek information processing circuit 40, by which the actuator 41 is controlled so that the magnetic head 8 is moved to an arbitrary position on the magnetic disk 3.

Figure 29:
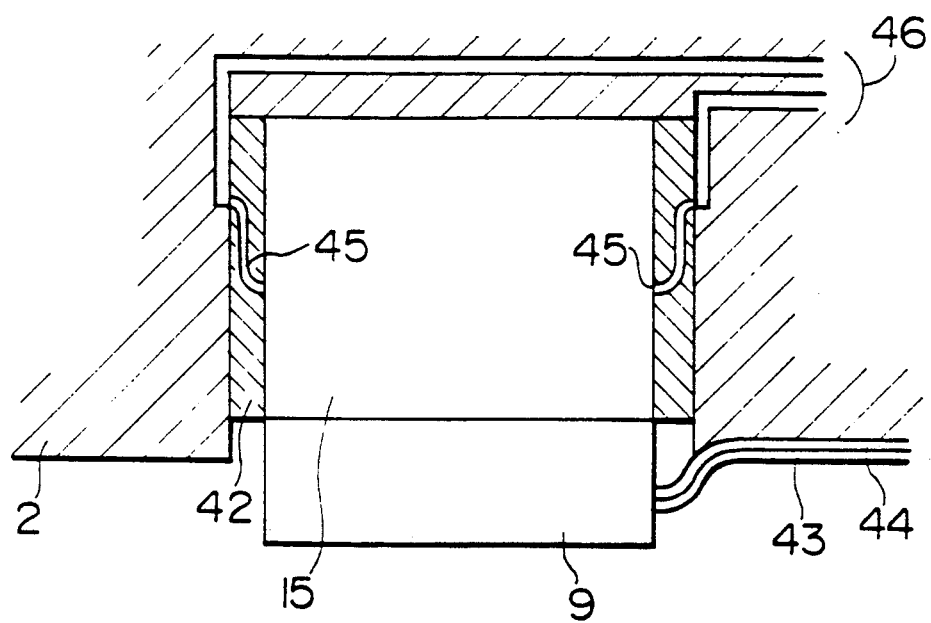
FIG. 29 is a diagram showing a variant of the recording transducer used in the embodiment of FIG. 28.

Next the displacement mechanism, shown in FIG. 28 which is a position adjusting mechanism with respect to the recording medium will be explained. The displacement mechanism comprises a piezoelectric device 15 fixed at its one end to the magnetic head carrier 2, in which an electric circuit 46 is connected to an electrode wires 45 of the piezoelectric device 15 for supplying the operating voltage, as shown in FIG. 29. The space between the piezoelectric device 15 and magnetic head carrier 2 is filled with a filling material 42 formed of resilient silicon rubber or the like. The recording transducer supporter 9 changes its position relative to the magnetic head carrier 2 in response to the expansion or contraction of the piezoelectric device 15, and therefore the recording signal cable 43 and field electron emission electrode cable 4 are preferably set slackly as shown in FIG. 29. The marginal length of the cables 43 and 44 can be small since the displacement needed for the recording transducer supporter 9 is 100 nm or less. The filling material 42 having an appropriate viscosity and elasticity does not hamper the motion of the piezoelectric device 15 and at the same time damps the vibration of the piezoelectric device, whereby the aerodynamic characteristics of this section can be regulated. The piezoelectric device is generally capable of controlling positions of the order of angstroms, and this accuracy is sufficient to control the clearance ranging 0 to 100 nm between the magnetic head and recording medium.

Figure 30:
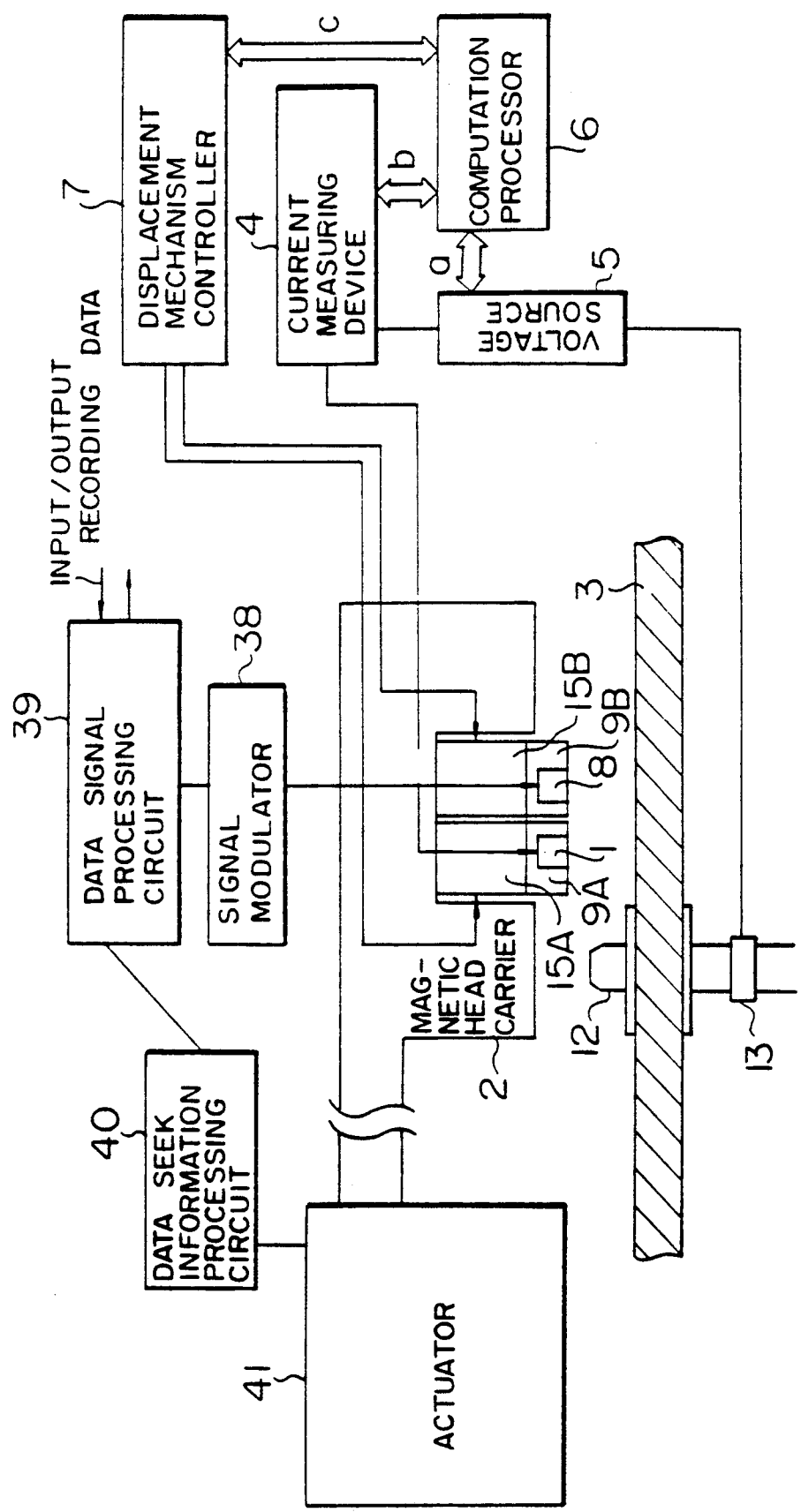
FIGS. 30 and 31 are block diagrams showing variants of the embodiment of FIG. 28.

Next, a modified embodiment derived from FIG. 28 is shown in FIG. 30. In this embodiment, the electrode section 1 and recording transducer 8 are provided with displacement mechanisms 15A and 15B, respectively, so that the distances from the electrode section 1 and magnetic head 8 to the magnetic disk 3 are controlled independently. In this case, it is possible to adjust the distance between the magnetic disk 3 and magnetic head 8 arbitrarily in such a manner that the electrode section 1 responds to a slow displacement of the magnetic disk 3 caused by the rotation, the supporter 9A of the electrode section. 1 sweeps relatively large obstacles such as dust obstacles on the surface of the magnetic disk 3, and the magnetic head which has been moving in unison with the electrode section 1 responds quickly to a small dust particle on the disk surface in response to an abrupt change in the field electron current in the electrode section 1.

The control section for controlling the clearance between magnetic head 8 and magnetic disk 3 comprises a voltage source 5 which provides a potential difference between the conductor section of the magnetic disk 3 and electrode section 1, a current measuring device 4 having electrical continuity to somewhere among the electrode section 1, the conductor section of the magnetic disk 3 and the voltage source 5, a computation processor 6 which operates based on a program for calculating the distance between the magnetic disk 3 and electrode section 1 from the current value measured by the current measuring device 4, the voltage value applied by the voltage source 5 and such data as the dielectric constant and average thickness of a dielectric substance if it is coated over the magnetic disk surface and for calculating the value of a distance between the magnetic head and magnetic disk to be varied, and a drive controller 7 for the displacement mechanism 15 (15A and 15B in FIG. 30) which receives data from the computation processor 6, as shown in FIGS. 28 and 30. In the figure, indicated by a, b and c are buses on which displacement data for the displacement mechanism, measured data for the field electron emission current and application voltage data for the voltage source 5, respectively, are transmitted.

Figure 31:
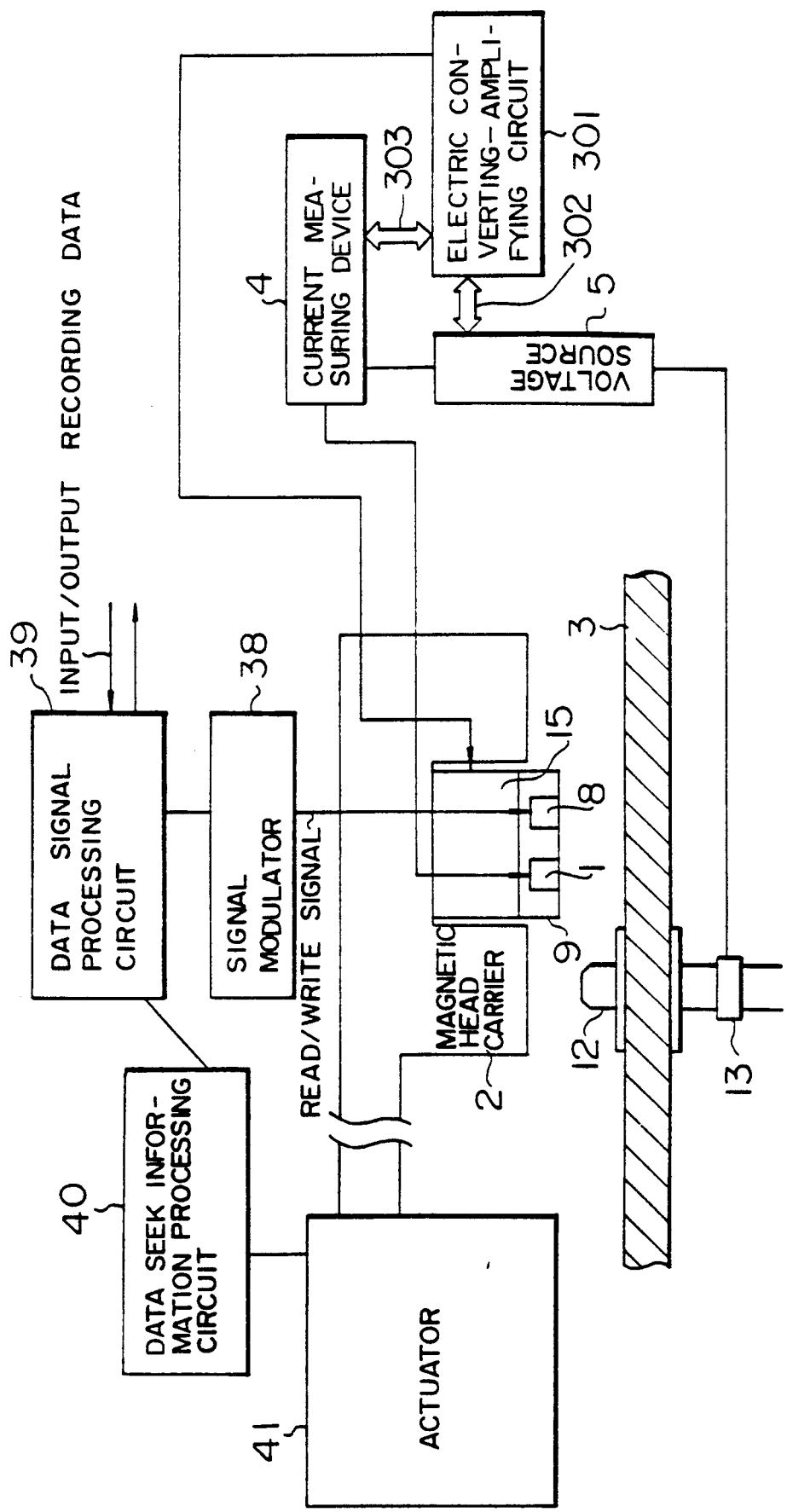

Although in FIGS. 28 and 30 the measured current and applied voltage are digitized and processed by the computation processor 6 and the control signal is sent to the controller 7 of the displacement, mechanism 15, an alternative arrangement, as shown in FIG. 31, is to use an electrical converting-amplifying circuit 301 which produces the drive output for the displacement mechanism 15 from the voltage provided by the voltage source 5 and an analog-converted output of the field electron emission current measured by the current measuring device 4. Also in this case, the computation processor can be used for the control of the voltage source 5 and current measuring device 4, as shown in FIG. 31.

Figure 32:
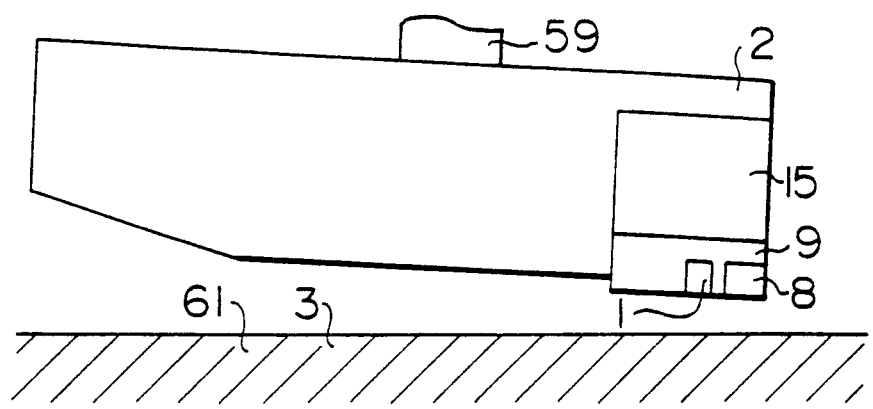
FIGS. 32 to 34 are diagrams showing variants of the magnetic head carrier.
Figure 33:
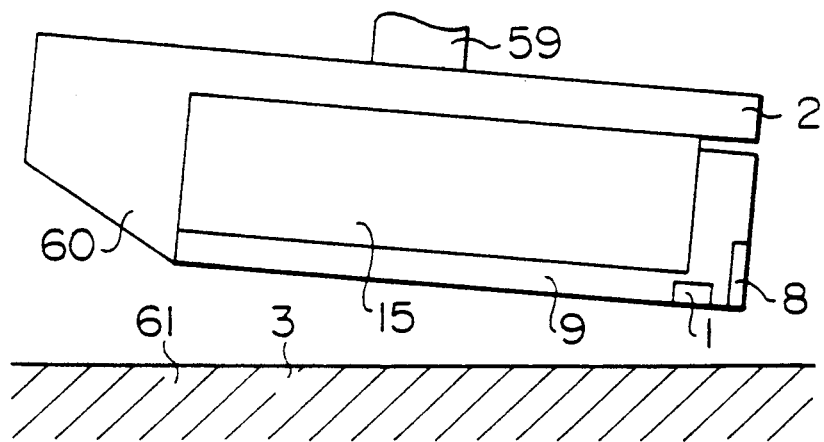

Next, FIGS. 32 and 33 show modified embodiments of the magnetic head carrier 2. The embodiment of FIG. 32 is designed to move only the tail section of the head carrier for controlling the clearance of the electrode section 1 and magnetic head 8. The magnetic disk 3 as a recording medium is coated on its surface with a thin protection film with a thickness of several tens of nm with the formation below it of a conductive magnetic recording medium, or the magnetic disk is coated on its surface with a conductive sputtered film with a thickness of several nm. In this embodiment, the movement of the magnetic head carrier and the movement of the displacement mechanism 15 do not interfere with each other. In contrast, in the embodiment of FIG. 33, the displacement mechanism 15 is a major part of the magnetic head carrier, which has a movable bottom plane so that the head carrier has its aerodynamic characteristics varied in response to the displacement of the displacement mechanism 15 thereby to vary the clearance of the whole head carrier.

Figure 34:
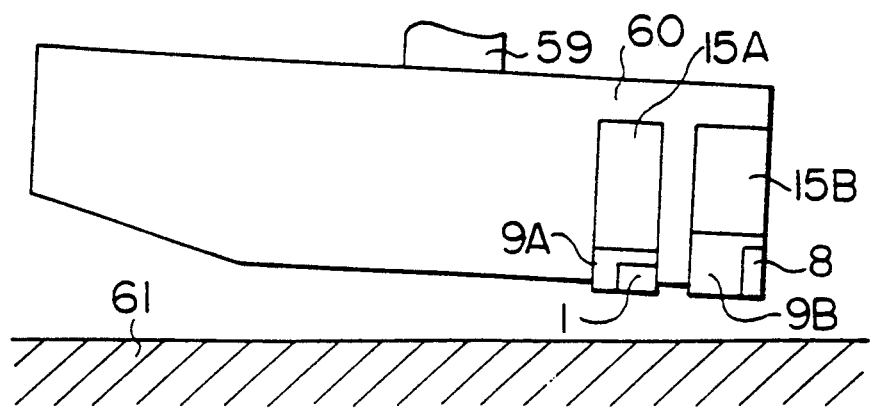

FIG. 34 shows a modified embodiment derived from FIG. 30. This embodiment is designed to control the clearances of the electrode section 1 and magnetic head 8 separately, and to regulate the clearance of the whole magnetic head carrier 2 by changing the aerodynamic characteristics.

The control method for the foregoing recording apparatus will be explained with reference to the flowchart of FIG. 35.

The computation processor 6 introduces setting data at the start-up of the recording apparatus (step 3500). The setting data includes the attributes of the recording medium 3, the setting clearance between the recording head 8 and recording medium 3, data for operating the displacement mechanism 7, the criterion for assessing the measured clearance between the recording head 8 and recording medium 3, and the formula and associated compensation data for transforming the value of field electron emission current into the distance between the recording head 8 and recording medium 3. After the setting data has been introduced, the computation processor 6 sends a signal to the voltage source 5, current measuring device 4 and displacement mechanism 7 thereby to confirm the operation of these devices (step 3505).

If any of these devices is found to be abnormal in the step 3505, a recovery operation is conducted (step 3530). After the recovery, the normal routine is restored, or if the abnormality is not resolved, the recording apparatus is brought to a halt. Abnormalities treated here include an excessive vibration, a temperature change, and a state of the power source, that jeopardize the further continuous operation.

Next, step 3510 introduces measured data, which includes the potential difference between the electrode section 1 and recording medium 3, the value of field electron emission current, etc. The computation processor 6 calculates in step 3515 the distance between the recording head 8 and recording medium 3 from the introduced data, and the sequence proceeds to step 2520. The step 3520 implements a brief assessment for the calculated distance, and if the distance is judged to be abnormal, the sequence proceeds to step 3535 for conducting the abnormality process.

In case the result of brief assessment is within the range of normality, the sequence proceeds to step 3525 to test whether the displacement mechanism 15 needs to be displaced. If the need is negated, the sequence returns to step 3510, and the normal measurement routine up to step 3525 is repeated at each sampling. If the need of displacement of the displacement mechanism 15 is affirmed, the sequence proceeds to step 3530, in which a control command is sent from the computation processor 6 to the displacement mechanism controller 7. The displacement mechanism 7 responds to this command to apply the operating voltage to the displacement mechanism 15 which comprises a piezoelectric device for example, thereby moving the recording transducer supporter 9 including the recording head 8 and electrode section 1 by the amount required in the vertical direction so that the distance between the recording head 8 and recording medium 3 is adjusted.

In the control method for the recording apparatus described above, the distances among the recording medium 3, electrode section 1 and recording head 8 are equal or have known differences, and therefore they are in a definite relation. Accordingly, the electric field generated in the space between the conductor of recording medium 3 is determined from the potential difference and distance.

The result of the process for the measured data is used to modify the transformed distance between the recording head 8 and recording medium 3 in accordance with the data of recording medium 3 and the data of the material and the shape of electrode of the recording transducer supporter which have been introduced to the computation processor 6. The modification is of the case where the dielectric layer which covers the surface of the recording medium 3 has become thinner due to wear, and it is necessary for the recording apparatus at its start-up to know the thickness of the recording medium surface through the method explained in FIGS. 10 to 16. Another case of modification for the computation result is a change in the operational environment of the recording apparatus, such as the deformation of components in the apparatus due to a different ambient temperature. After the process, the amount of displacement made by the displacement mechanism is determined, and the clearance between the recording head 8 and recording medium 3 can be adjusted to the prescribed value. The computation processor 6 has the ability of measurement for the thickness of dielectric substance on the recording medium surface and optimization of the field electron emission current, as described in FIGS. 10 to 16.

Next, the process of the case of unsuccessful recovery in step 3535 of the control method described above in the flowchart of FIG. 36 will be explained. In the normal operation of the recording apparatus, if the distance between the recording head 8 and recording medium 3 has gone out of the normal range, step 3600 halts the recording operation and sets a variable N to the counter which counts abnormal events. The next step 3605 assesses the urgency the calculated distance between the recording head 8 and recording medium 3. If the distance is re-estimated to be within the normal range, the halt state is cancelled and the routine of FIG. 35 is restored. If the urgency test has revealed the possibility of damage to the recording apparatus or the content of record, the emergency halt operation takes place thereby to prevent such accidents from occurring.

In case the distance is found to be outside the normal range, although it does not need the emergency halt, the sequence process to step 3610 for testing whether or not the distance allows the record reading or writing on the recording medium 3. If the step 3610 returns a negative test result, step 3615 halts the record read or write operation. The next step 3620 increments the abnormality event counter, and if the count value exceeds a predetermined number Y, step 3650 halts the recording operation so as to minimize the influence on the input/output data and the peripheral devices. If the step 3620 reveals that the count value is less than or equal to the predetermined value Y, the displacement mechanism controller 7 is activated to have a restoration operation (step 3625), the distance between the recording transducer and recording medium is measured (step 3630), and the sequence proceeds to the distance re-estimation starting at step 3605.

In case the step 3630 has revealed a distance which allows the record reading or writing on the recording medium, step 3635 increments the counter and compares the count with a predetermined upper limit number X. If the count is found to exceed the limit X, the sequence proceeds to step 3650 to halt the recording apparatus. If the step 3635 reveals that the incremented count value is X or less, step 3640 carries out the restoration operation, step 3645 measures the distance between the recording transducer and recording medium, and the sequence returns to step 605. The threshold values X and Y for the counter used in the above process are set in advance with the intention of limiting the length of abnormality recovery process by limiting the iteration of the restoration operation, thereby protecting the recording apparatus from an overload. These processing steps can be programmed and stored in the computation processor 6.

Figure 35:
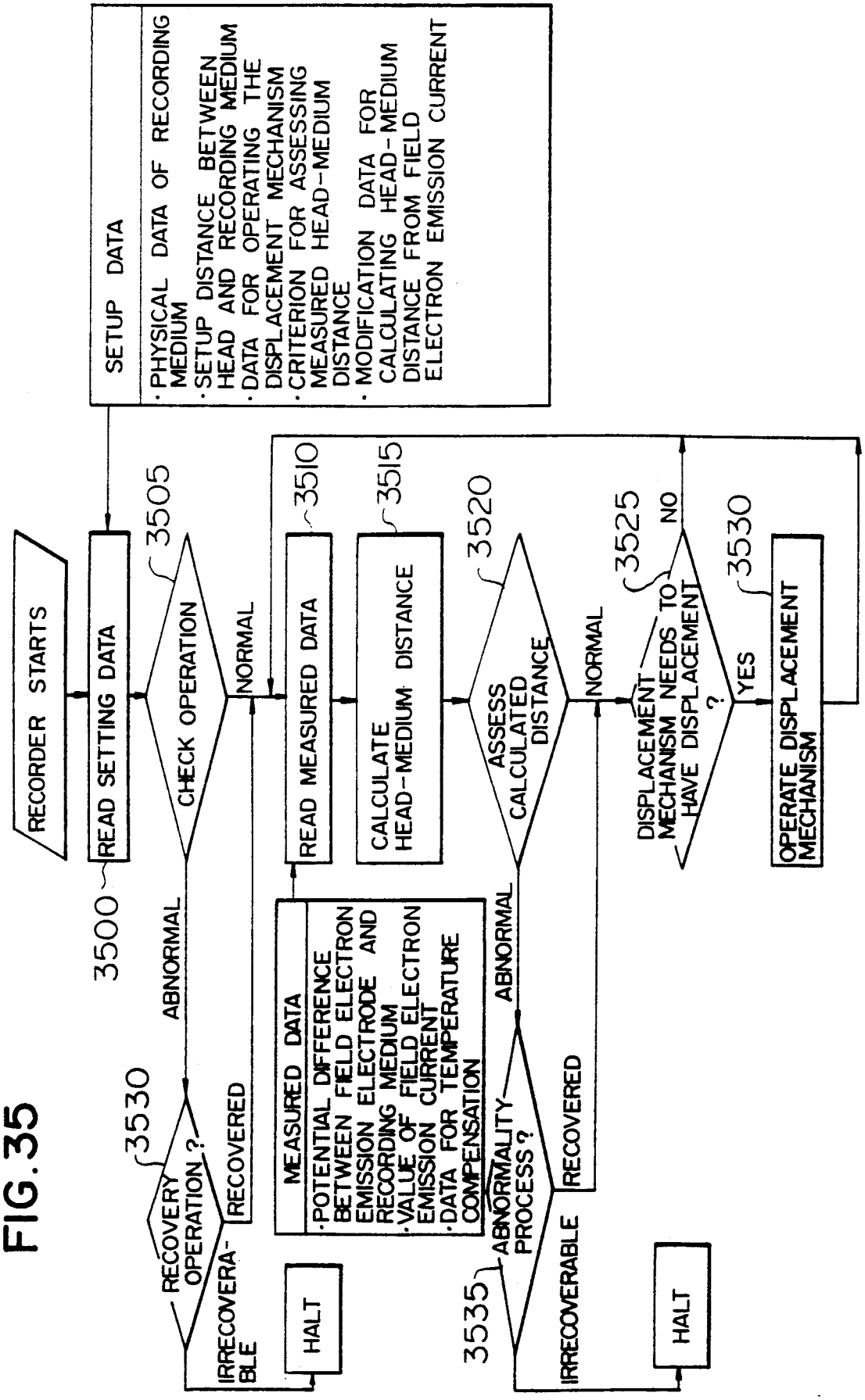
FIGS. 35 and 36 are flowcharts showing the control method for the recorder.
Figure 36:
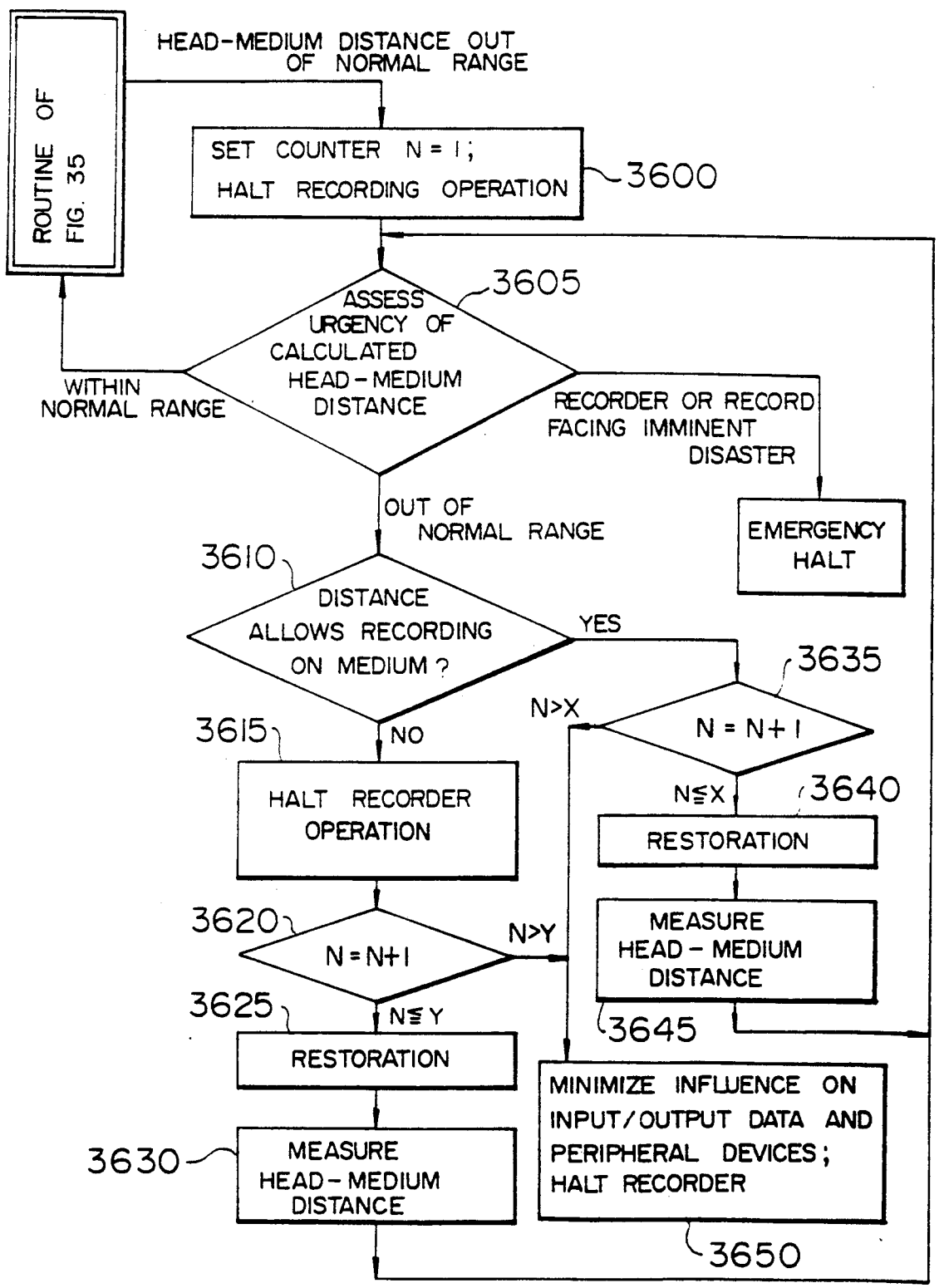

According to the control method of a recording apparatus shown in FIGS. 35 and 36, the voltage source 5 generates a potential difference between the conductor of the recording medium and the field electron emission electrode 1 of the recording transducer supporter 9, and a field electron emission current, which varies in intensity depending on the potential difference and the electric field determined from the distance between these members, is produced. From this current, the distance between the recording head 8 and recording medium is calculated with reference to data of the recording medium and data related to the property of the recording transducer supporter 9. The calculated distance is compared with a certain criterion, and the restoration operation including the operation of the displacement mechanism takes place accordingly. In the worst case, the recording apparatus is halted thereby to protect the recording apparatus and the content of the record on the recording medium.

Figure 37:
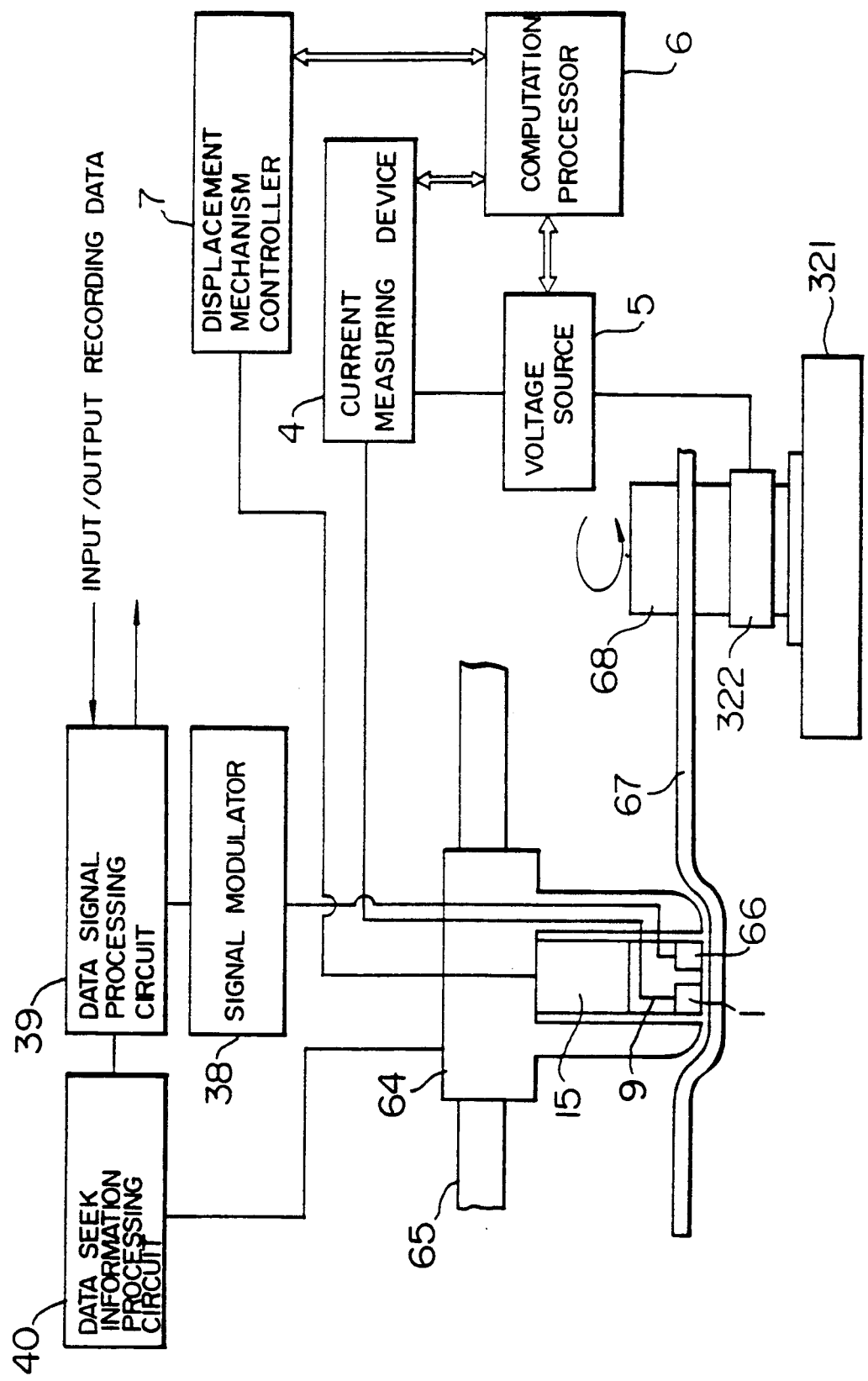
FIG. 37 is a block diagram showing an embodiment of this invention applied to a floppy magnetic disk drive unit.

FIG. 37 shows an embodiment of this invention applied to a floppy magnetic disk drive unit. This embodiment is also provided with a voltage source 5, computation processor 6, displacement mechanism controller 7, data seek information processing circuit 40, data signal processing circuit 39 and signal modulator 38, and it has the same function as the preceding embodiments. A flexible magnetic disk 67 has electrical continuity to the shaft of a spindle motor 321, and it is rotated by the spindle motor 321. The voltage source 5 has one end connected to a rotary coupling 322 which is fitted on the shaft of the spindle motor 321.

A head supporting mechanism 64 which functions equivalently to the magnetic head carrier is movable on a guide 65 in response to the output signal from the data seek information processing circuit 40, and the recording transducer supporter 6 incorporating an electrode section 1 and magnetic head 66 is pressed to the flexible magnetic disk 67. The recording transducer supporter 9 has its clearance with the magnetic disk 3 adjusted by means of a displacement mechanism 15. Also in this embodiment, the air stream between the magnetic head 66 and magnetic disk 67 created by the rotation of the magnetic disk 67 causes the magnetic head 66 to have an aerodynamic lift, and the clearance is adjusted in the same manner as the preceding embodiments so that data is recorded at an optimal clearance.

Figure 38:
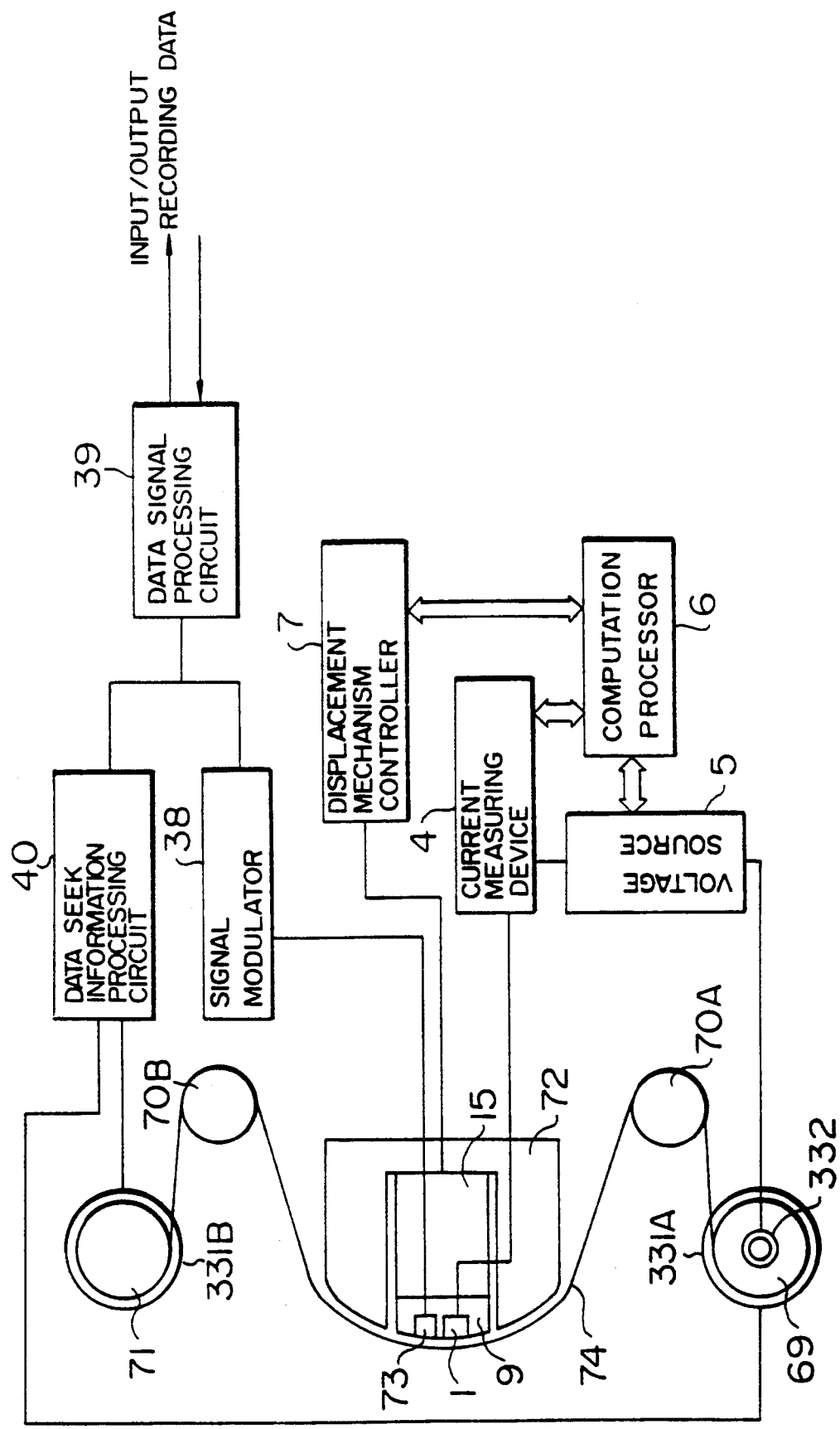
FIG. 38 is a block diagram showing an embodiment of this invention applied to a magnetic tape drive unit.

FIG. 38 shows an embodiment of a magnetic tape unit. A magnetic tape 74 runs from a supply reel 69 to a roller 70A, to a recording transduce 72, and to a roller 70B, and it is wound on a takeup reel 71. The electrode section 1 and magnetic head combination 73 which implements the recording, reproduction and erasure are incorporated in the recording transducer supporter 9, and the clearance with the magnetic tape 74 is adjusted by the displacement mechanism 15, which is fixed to the head supporter 72. A conceivable adjustment means for the measured clearance between the head 1 and tape 74, alternative to the displacement mechanism 15, is to vary the tension of the tape 74.

In this embodiment, one end of the voltage source 5 has electrical continuity to the magnetic tape 74 through the magnetic tape supply reel 69 which is in electrical connection with the magnetic tape 4, and a rotary coupler 332 fitted to the reel 69. The above-mentioned tension adjustment means for the magnetic tape 74 can be achieved by adjusting the torque of the reel drive motors 331A and 331B provided for the reels 69 and 71.

Figure 39:
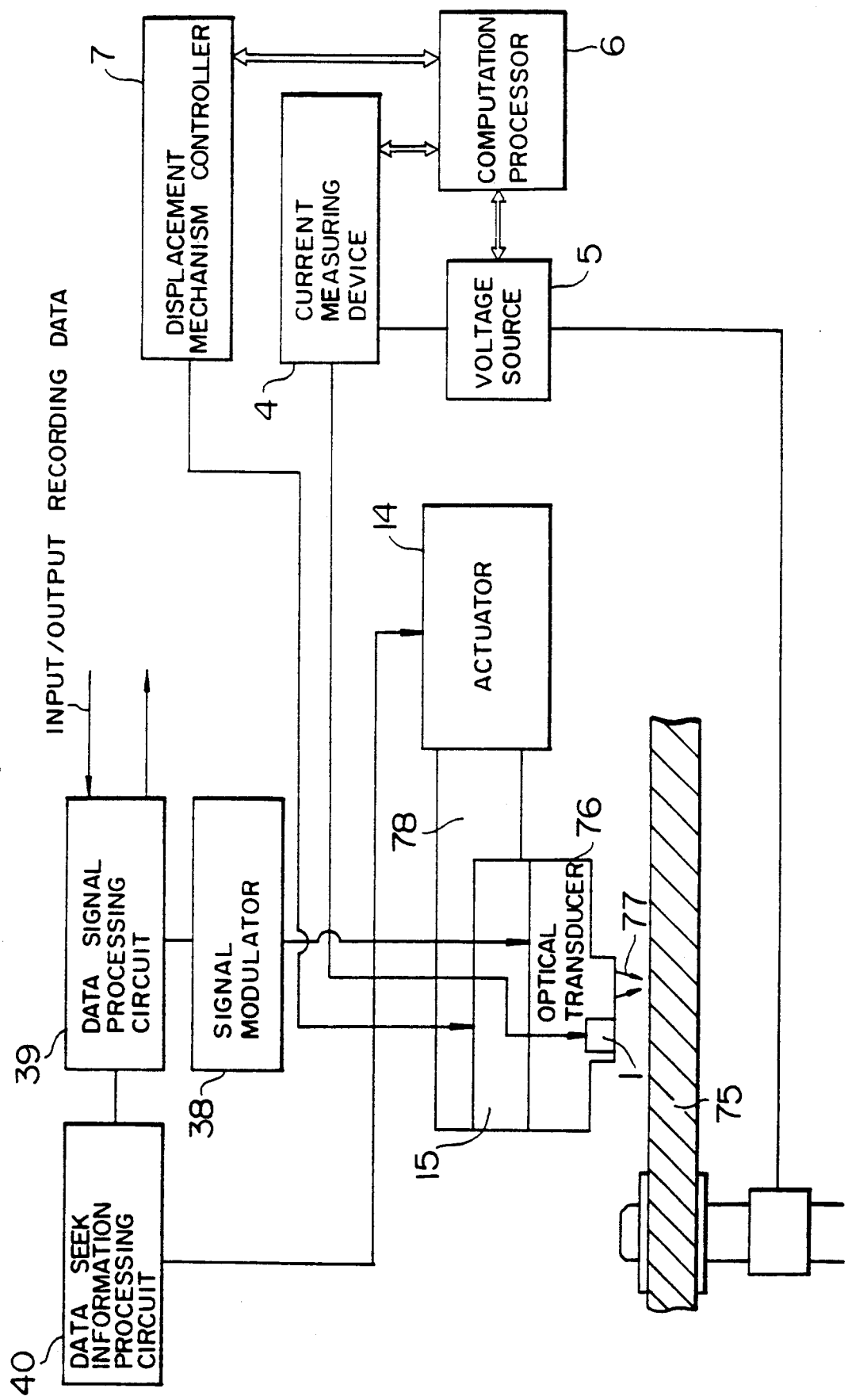
FIGS. 39 and 40 are block diagrams showing embodiments of this invention applied to an optical disk drive unit.
Figure 40:
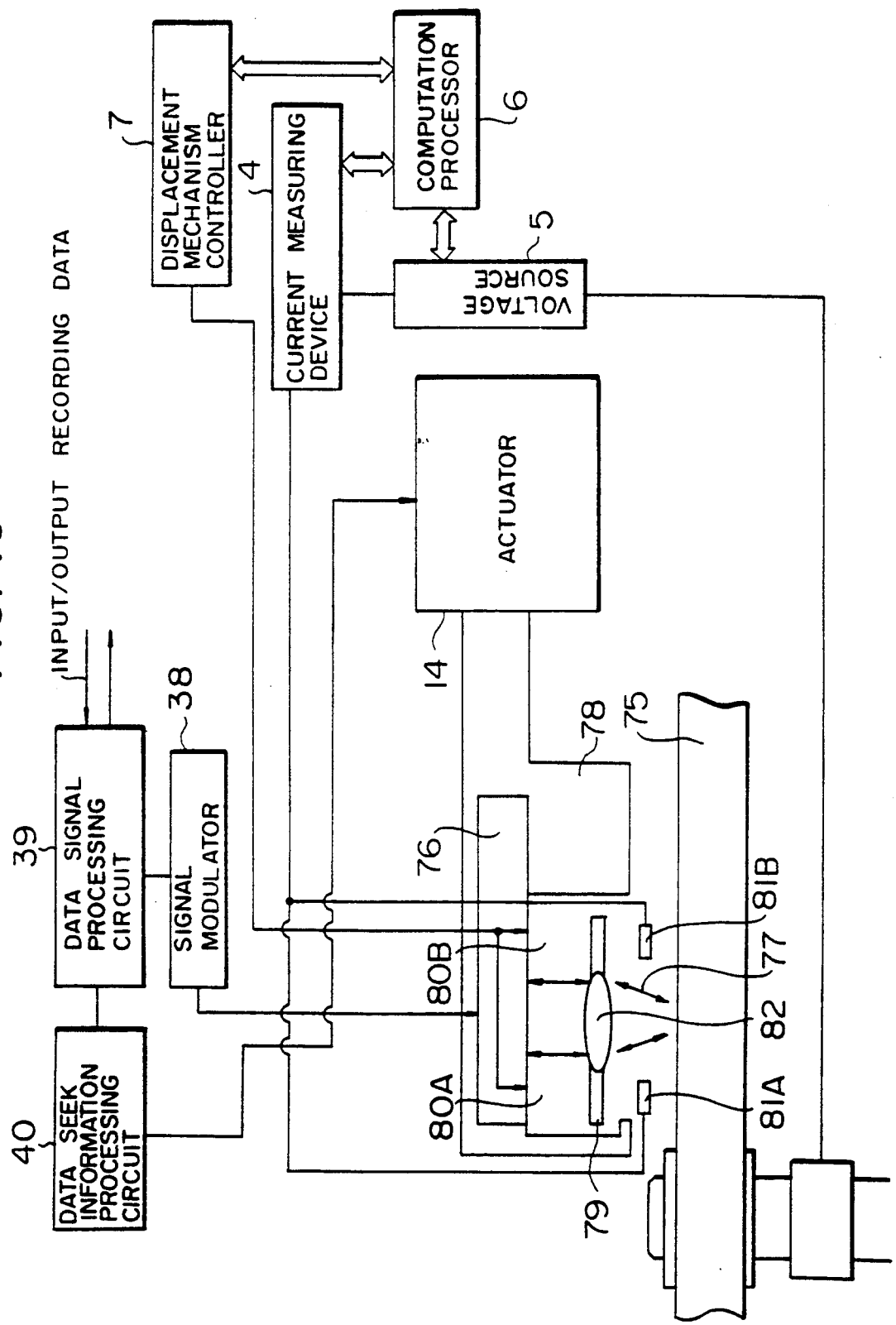

FIG. 39 shows an embodiment of an optical disk drive unit. An optical recording or reproducing transducer 76 is fitted to a displacement mechanism 15 by means of a support mechanism 78 which moves over an optical disk 75. The field electron emission electrode 1 is incorporated in the optical recording or reproducing transducer 76. The displacement mechanism 15 moves the optical recording or reproducing transducer 76 in the vertical direction, and the focal depth of the recording or reproducing beam 77 is controlled based on the inventive method. FIG. 40 also shows an optical disk drive unit, which differs from the embodiment of FIG. 39 in that an optical lens 82 supported by a lens supporter 79 and electrodes 81A and 81B are displaced by means of displacement mechanisms 80A and 80B so as to vary the focal depth of the recording or reproducing beam 27. In this embodiment, the only displaced members are the lens 82, lens supporter 79 and electrodes 81A and 81B, allowing the optical recording or reproducing transducer 76 to be free from movement, as shown in FIG. 40, and therefore the displacement mechanisms 80A and 80B have their load reduced and the velocity of displacement can be enhanced. Because the electrodes 81A and 81B are located on both sides of the lens 82, it becomes possible to know the parallelism of the optical disk 75 with the lens 82 and adjust it by means of the displacement mechanisms 80A and 80B, thereby accomplishing fine tracking.

We claim:

1. A recording transducer clearance measuring apparatus for measuring the clearance between a recording transducer and a recording medium which includes at least a conductive layer or conductive section, said apparatus comprising:
   a field electron emission electrode section disposed on the surface of said recording transducer confronting said recording medium and comprising at least one field electron emission electrode;
   a voltage source which applies a voltage, that is greater at least at a peak value thereof than the work function of the surface of said field electron emission electrode or the conductive layer or conductive section of said recording medium, between said field electron emission electrode section and the conductive layer or conductive section of said recording medium;
   a current measuring device, which is located on any current path amount said voltage source, said field electron emission electrode section, and the conductive layer or conductive section of said recording medium, for measuring a current flowing on the current path; and
   a computation processor which receives a current value measured by said current measuring device and calculates the amount of clearance between said recording transducer and said recording medium;
   wherein the current measuring device measures only a field electron current flowing on the current path.

2. A recording transducer clearance measuring apparatus according to claim 1, wherein said field electron emission electrode section comprises a plurality of field electron emission electrodes disposed on the surface of said recording transducer confronting said recording medium.

3. A recording transducer clearance measuring apparatus according to claim 1, wherein said field electron emission electrode section is fitted on the surface of said recording transducer confronting said recording medium by means of an advancement-retraction mechanism capable of adjusting the position of said field electron emission electrode section relative to said recording medium.

4. A recording transducer clearance measuring apparatus according to claim 3, wherein said recording transducer includes a recording element capable of writing and/or reading a record on said recording medium, said recording element being disposed on the surface of said recording transducer confronting said recording medium, and wherein said computation processor is designed to control said advancement/retraction mechanism so that said recording transducer has a specified clearance with respect to said recording medium.

5. A recording transducer clearance measuring apparatus according to claim 1, wherein said field electron emission electrode section comprises a plurality of field of electron emission electrodes.

6. A recording transducer clearance measuring apparatus according to claim 5, wherein said electrodes are arranged such that the surfaces of said electrodes confronting said recording medium are parallel to the plane of said recording medium.

7. A recording transducer clearance measuring apparatus according to claim 5, wherein said electrodes are arranged such that the surfaces of said electrodes confronting said recording medium slant with respect to the plane of said recording medium.

8. A recording transducer clearance measuring apparatus according to claim 5, wherein said electrodes have mutually different heights with respect to said recording medium.

9. A recording transducer clearance measuring apparatus according to claim 5, wherein equal potentials are applied to said electrodes.

10. A recording transducer clearance measuring apparatus according to claim 5, wherein mutually different potentials are applied to said electrodes.

11. A recording transducer clearance measuring apparatus according to claim 1, wherein the voltage applied between said field electron emission electrode section and the conductive layer or conductive section of said recording medium is a constant voltage which is greater in magnitude than the work function of said field electron emission electrode or the conductive layer or conductive section of said recording medium.

12. A recording transducer clearance measuring apparatus according to claim 1, wherein the voltage applied between said field electron emission electrode section and the conductive layer or conductive section of said recording medium is a voltage which varies with time within a voltage range that is greater in magnitude than the work function of said field electron emission electrode or the conductive layer or conductive section of said recording medium.

13. A recording transducer clearance measuring apparatus according to claim 1, wherein the voltage applied between said field electron emission electrode section and the conductive layer or conductive section of said recording medium is a voltage which varies with time within a voltage range that is partly greater in magnitude than the work function of said field electron emission electrode or the conductive layer or conductive section of said recording medium.

14. A recording transducer clearance measuring apparatus according to claim 1, wherein said recording transducer comprises a magnetic recording transducer and said recording medium comprises a magnetic recording medium.

15. A recording transducer clearance measuring apparatus for measuring the clearance between a recording transducer and a recording medium which includes at least a conductive layer or conductive section, said apparatus comprising:
- a field electron emission electrode section disposed on the surface of said recording transducer confronting said recording medium and comprising at least one field electron emission electrode;
- a voltage source which applied a voltage, that is greater at least at a peak value thereof than the work function of the surface of said field electron emission electrode or the conductive layer or conductive section of said recording medium, between said field electron emission electrode section and the conductive layer or conductive section of said recording medium;
- a current measuring device, which is located on any current path among said voltage source, said field electron emission electrode section, and the conductive layer or conductive section of said recording medium, for measuring a current flowing on the current path; and
- a computation processor which receives a current value measured by said current measuring device and calculates the amount of clearance between said recording transducer and said recording medium;
- wherein said field electron emission electrode section is covered, in non-contact fashion on the side thereof confronting said recording medium, with a protection device made of a dielectric substance.

16. A recording transducer clearance measuring apparatus according to claim 15, wherein said protection device covering said field electron emission electrode section can be opened or closed.

17. A recording transducer clearance measuring apparatus according to claim 15, wherein said field electron emission electrode section is fitted on the surface of said recording transducer confronting said recording medium by means of an advancement-retraction mechanism capable of adjusting the position of said field electron emission electrode section relative to said recording medium.

18. A recording transducer clearance measuring apparatus for measuring the clearance between a recording transducer and a recording medium which includes at least a conductive layer or conductive section, said apparatus comprising:
- a field electron emission electrode section disposed on the surface of said recording transducer confronting said recording medium and comprising at least one field electron emission electrode;
- a voltage source which applies a voltage, that is greater at least at a peak value thereof than the work function of the surface of said field electron emission electrode or the conductive layer or conductive section of said recording medium, between said field electron emission electrode section and the conductive layer or conductive section of said recording medium;
- a current measuring device, which is located on any current path among said voltage source, said field electron emission electrode section, and the conductive layer or conductive section of said recording medium, for measuring a current flowing on the current path; and
- a computation processor which receives a current value measured by said current measuring device and calculates the amount of clearance between said recording transducer and said recording medium;
- wherein said field electron emission electrode section comprises a plurality of field electron emission electrodes; and
- wherein said electrodes have work function which are different from each other.

19. A recording transducer clearance measuring apparatus according to claim 18, wherein said field electron emission electrode section is fitted on the surface of said recording transducer confronting said recording medium by means of an advancement-retraction mechanism capable of adjusting the position of said field electron emission electrode section relative to said recording medium.

20. A recording transducer clearance measuring apparatus for measuring the clearance between a recording transducer and a recording medium which includes at least a conductive layer or conductive section, said apparatus comprising:
- a field electron emission electrode section disposed on the surface of said recording transducer confronting said recording medium and comprising at least one field electron emission electrode;
- a voltage source which applies a voltage, that is greater at least at a peak value thereof than the work function of the surface of said field electron emission electrode or the conductive layer or conductive section of said recording medium, between said field electron emission electrode section and the conductive layer or conductive section of said recording medium;
- a current measuring device, which is located on any current path among said voltage source, said field electron emission electrode section, and the conductive layer or conductive section of said recording medium, for measuring a current flowing on the current path; and
- a computation processor which receives a current value measured by said current measuring device and calculates the amount of clearance between said recording transducer and said recording medium;
- wherein said field electron emission electrode section is fitted on the surface of said recording transducer confronting said recording medium by means of an advancement-retraction mechanism capable of adjusting the position of said field electron emission electrode section relative to said recording medium;

wherein said recording transducer includes a recording element capable of writing and/or reading a record on said recording medium, said recording element being disposed on the surface of said recording transducer confronting said recording medium, and wherein said computation processor is designed to control said advancement/retraction mechanism so that said recording transducer has a specified clearance with respect to said recording medium; and wherein said advancement/retraction mechanism is divided into two advancement/retraction mechanisms for moving said field electron emission electrode section and said recording element independently, and wherein said computation processor is designed to control the movement of said two advancement/retraction mechanisms independently.

21. A recording transducer clearance measuring apparatus for measuring the clearance between a recording transducer and a recording medium which includes at least a conductive layer or conductive section, said apparatus comprising:

a field electron emission electrode section disposed on the surface of said recording transducer confronting said recording medium and comprising at least one field electron emission electrode;

a voltage source which applies a voltage, that is greater at least at a peak value thereof than the work function of the surface of said field electron emission electrode or the conductive layer or conductive section of said recording medium, between said field electron emission electrode section and the conductive layer or conductive section of said recording medium; and a current measuring device, which is located on any current path among said voltage source, said field electron emission electrode section, and the conductive layer or conductive section of said recording medium, for measuring a field electron emission current flowing on the current path; and wherein said field electron emission electrode section is fitted on the surface of said recording transducer confronting said recording medium by means of an advancement-retraction mechanisms capable of adjusting the position of said field electron emission electrode section relative to said recording medium; and wherein said recording transducer includes a recording element capable of writing and/or reading a record on said recording medium, said recording element being disposed on the surface of said recording transducer confronting said recording medium;

said apparatus further comprising:

an electrical converting-amplifying the field electron emission current measured by said current measuring device, and for controlling said advancement/retraction mechanism on the basis of the electrically converted and amplified field electron emission current so that said recording transducer has a specified clearance with respect to said recording medium;

wherein the current measuring device measure only a field electron emission current flowing on the current path.

22. A method of controlling a recording apparatus comprising the steps of:

generating an electric field, which is a function of the distance between a field electron emission electrode and a recording medium, on the surface of said field electron emission electrode confronting said recording medium;

measuring a change in the quantity of electricity which is lost at said field electron emission electrode due to field electron emission that occurs between said field electron emission electrode and said recording medium; and controlling the clearance between a recording transducer and said recording medium in accordance with the change in the quantity of electricity which is lost at said field electron emission electrode section;

wherein the measuring step includes measuring only a change in the quantity of electricity which is lost due to field electron emission by measuring only a field electron emission current.

23. A method of controlling a recording apparatus according to claim 22, further comprising the steps of:

calculating the distance between said recording transducer and said recording medium from the quantity of electricity lost at said field electron emission electrode;

assessing the distance if the distance exceeds a predetermined value; and altering the operational condition of said recording apparatus in accordance with the result of the assessing step.

24. A method of controlling a recording apparatus according to claim 21, wherein the step of altering the operational condition of said recording apparatus includes the step of halting the operation of said recording apparatus.

* * * * *